United States Patent
Huang

(10) Patent No.: US 9,016,659 B2
(45) Date of Patent: Apr. 28, 2015

(54) FIBER REINFORCED ELASTOMER ANISOTROPIC ANNULAR BLOWOUT PREVENTER

(75) Inventor: Ming Yu Huang, Kingwood, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 0 days.

(21) Appl. No.: 13/533,365

(22) Filed: Jun. 26, 2012

(65) Prior Publication Data

US 2013/0341538 A1 Dec. 26, 2013

(51) Int. Cl.
*E21B 33/06* (2006.01)
*E21B 33/1295* (2006.01)
*B29K 21/00* (2006.01)
*B29K 105/06* (2006.01)

(52) U.S. Cl.
CPC ............ *E21B 33/06* (2013.01); *B29K 2021/00* (2013.01); *B29K 2105/06* (2013.01)

(58) Field of Classification Search
USPC ............. 251/1.1, 1.2, 1.3; 277/322, 335, 336, 277/341, 500, 510, 534
See application file for complete search history.

(56) References Cited

U.S. PATENT DOCUMENTS

| | | | |
|---|---|---|---|
| 2,609,836 A | 9/1952 | Knox | |
| 5,176,781 A | 1/1993 | Mori et al. | |
| 5,513,683 A | 5/1996 | Causa et al. | |
| 5,576,104 A | 11/1996 | Causa et al. | |
| 5,713,581 A | 2/1998 | Carlson | |
| 6,899,782 B1* | 5/2005 | Chang et al. | 156/244.11 |
| 8,091,855 B1 | 1/2012 | Huang | |
| 2007/0144734 A1* | 6/2007 | Xu et al. | 166/187 |
| 2008/0066906 A1 | 3/2008 | Huff et al. | |
| 2008/0194717 A1* | 8/2008 | Vaidya et al. | 521/142 |
| 2010/0140516 A1* | 6/2010 | Butuc | 251/1.1 |
| 2010/0294482 A1* | 11/2010 | Araujo et al. | 166/85.4 |

FOREIGN PATENT DOCUMENTS

EP 0134710 A2 3/1985

OTHER PUBLICATIONS

PCT Search Report issued in connection with corresponding WO Patent Application No. US2013/047458 dated on Jul. 2, 2014.

* cited by examiner

*Primary Examiner* — John K Fristoe, Jr.
*Assistant Examiner* — Daphne M Barry
(74) *Attorney, Agent, or Firm* — Bracewell & Giuliani LLP

(57) ABSTRACT

A packer unit for an annular blowout preventer including an annular elastomer body including an elastomer having a unidirectional grain and a quantity of fiber longitudinally aligned with the grain of the elastomer. A method of forming a packing unit for a blowout preventer including forming a fiber reinforced elastomer by aligning fibers with a grain of an elastomer; cutting a portion from the fiber reinforced elastomer in the direction of the grain; loading the cut portion in a packing unit mold such that the grain of the fiber reinforced elastomer of the cut portion is parallel to a packing unit axis; and heating the loaded packing unit mold.

21 Claims, 26 Drawing Sheets

**Optical Microscope (50x) of
Tensile Broken Surface of Example 21**

With Grain Specimen

Across Grain Specimen

Molding of 2" Sample Anistropic Annular Packer

Optical Microscope (50x) of Cross-section Surfaces Slit and Peeled From 2" Sample Packer Molded From of Example 21

Cross-section Perpendicular to Packer Axis

Cross-section Parallel to Packer Axis

Sketch of a Fiber Reinforced Anistropic Annular Packing Unit.
The Fiber Orientation is Parallel to Working Pressure (Pw)
and Perpendicular to Closing Pressure (Pc).

Fiber Orientation

Pc → ← Pc

Pw

FIBER REINFORCED ELASTOMER ANISOTROPIC ANNULAR BLOWOUT PREVENTER

BACKGROUND OF INVENTION

Well control is an important aspect of oil and gas exploration. When drilling a well, for example, in oil and gas exploration applications, safety devices must be put in place to prevent injury to personnel and damage to equipment resulting from unexpected events associated with the drilling activities.

Drilling wells in oil and gas exploration involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore. These "blowouts" may result in catastrophic destruction of the drilling equipment (including, for example, the drilling rig) and substantial injury or death of rig personnel.

Because of the risk of blowouts, blowout preventers ("BOPs") are typically installed at the surface or on the sea floor in deep water drilling arrangements to effectively seal a wellbore until active measures can be taken to control the kick. BOPs may be activated so that kicks are adequately controlled and "circulated out" of the system. There are several types of BOPs, one common type of which is an annular blowout preventer.

Annular BOPs typically comprise annular, elastomeric "packing units" that may be activated to encapsulate drillpipe and well tools to completely seal about a wellbore. In situations where no drillpipe or well tools are within the bore of the packing unit, the packing unit can be compressed to such an extent that the bore is entirely closed, acting as a valve on the wellbore. Typically, packing units are used in the case of sealing about a drillpipe, in which the packing unit can be quickly compressed, either manually or by machine, to affect a seal about the pipe to prevent a well from blowing out.

An example of an annular BOP having a packing unit is disclosed in U.S. Pat. No. 2,609,836, ("Knox") which is incorporated herein by reference in its entirety. The packing unit includes a plurality of metal inserts embedded in an elastomeric body. The metal inserts are typically spaced equal radial distances from one another about a longitudinal axis of the packing unit. The inserts provide structural support for the elastomeric body when the packing unit is radially compressed to seal against the well pressure. Upon compression of the packing unit about a drillpipe, or upon itself, to seal against the wellbore pressure, the elastomeric body is squeezed radially inward, causing the metal inserts to move radially inward as well.

FIG. 1 is an example of a background art annular BOP 101 including a housing 102. The annular BOP 101 has a bore 120 extending therethrough and is disposed about a longitudinal axis 103. A packing unit 105 is disposed within the annular BOP 101 about the longitudinal axis 103. The packing unit 105 includes an elastomeric annular body 107. The packing unit 105 includes a bore 111 concentric with the bore 120 of the BOP 101.

The annular BOP 101 is actuated by fluid pumped into opening 113 of a piston chamber 112. The fluid applies pressure to a piston 117, which moves the piston 117 upward. As the piston 117 moves upward, the piston 117 translates force to the packing unit 105 through a wedge face 118. The force translated to the packing unit 105 from the wedge face 118 is directed upward toward a removable head 119 of the annular BOP 101, and inward toward the longitudinal axis 103 of the annular BOP 101. Because the packing unit 105 is retained against the removable head 119 of the annular BOP 101, the packing unit 105 does not displace upward from the force translated to the packing unit 105 from the piston 117. However, the packing unit 105 does displace inward from the translated force, which compresses the packing unit 105 toward the longitudinal axis 103 of the annular BOP 101. In the event a drill pipe 130 is located along the longitudinal axis 103, with sufficient radial compression, the packing unit 105 will seal about the drill pipe into a "closed position." The open position is shown in FIG. 2 while the closed position is shown in FIG. 3. In the event a drill pipe is not present, the packing unit 105, with sufficient radial compression, will completely seal the bore 111.

An example of the packing unit 105 used in an annular BOP 101 is shown in FIG. 4. As before, the packing unit 105 includes an elastomeric annular body 107 and may include a plurality of metallic inserts 109. The metallic inserts 109 may be distributed at equal radial distances from each other in the elastomeric annular body 107 of the packing unit 105. The packing unit 105 has a bore 111 therethrough.

Elastomers of higher modulus have been used to provide annular packers having longer fatigue life. However, high modulus elastomers require higher closing pressure and more flexing cycles to seal the pipe or open hole. A packer with extreme stiffness may not close at all.

When incorporating fibers within a rubber compound, it is common to orient the fibers in the mill/extrusion grain direction. In comparison to unreinforced rubber compounds, fiber reinforced rubber compounds have increased modulus and decreased elongation along the mill grain. The unidirectional orientation of elastomer macromolecular chains and filler particles occurring in processes such as milling, extrusion or calendaring is called "grain", which results in anisotropy of elastomer vulcanizates. Short fibers mixed in elastomer compounds are longitudinally oriented along the grain direction, which provide the anisotropic properties that are usually much more significant than those provided from unreinforced rubber compounds. The modulus increases and elongation decreases across the grain direction as well but is much slighter than those properties with the grain direction. In other words, a fiber reinforced rubber slab is physically anisotropic, that is, the modulus with the grain orientation can be significantly higher than that across the grain or that of an unreinforced control. However, the elongation of fiber reinforced rubber compounds with the grain will decrease less than the increase of the modulus.

The traditional packing units for BOPs use nitrile rubber (NBR) for the elastomeric annular body NBR, which provide good physical properties and oil resistance.

Complicated annular BOP operations require improved packers. Accordingly, it would be desirable to provide improved packers for annular BOP operations.

SUMMARY OF INVENTION

In one aspect, embodiments disclosed herein relate to a packer unit to be used in an annular blowout preventer. The packer unit may include an annular elastomer body that comprises an elastomer having a unidirectional grain and a quantity of fiber longitudinally aligned with the grain of the elastomer.

In another aspect, embodiments disclosed herein relate to a method of forming a packing unit for a blowout preventer. The method includes forming a fiber reinforced elastomer including aligning fibers with a grain of an elastomer; cutting a portion from the fiber reinforced elastomer in the direction of the grain; loading the cut portion in a packing unit mold such that the grain of the fiber reinforced elastomer of the cut portion is parallel to a packing unit axis; and heating the loaded packing unit mold.

In another aspect, embodiments disclosed herein relate to an annular blowout preventer to be installed on a well. The annular blowout preventer includes a housing having a bore extending therethrough about a longitudinal axis; a packing unit disposed within the housing about the longitudinal axis; and a piston configured to move along the longitudinal axis and to squeeze the packing unit towards the longitudinal axis. The packing unit may include an elastomer body including a compound selected from the group consisting of a nitrile rubber (NBR), a carboxylated nitrile rubber (XNBR), or a hydrogenated nitrile rubber (HNBR) base polymer having a polymer chain and a unidirectional orientation grain; and a quantity of fiber longitudinally aligned with the grain of the elastomer.

DETAILED DESCRIPTION

Figure 1:
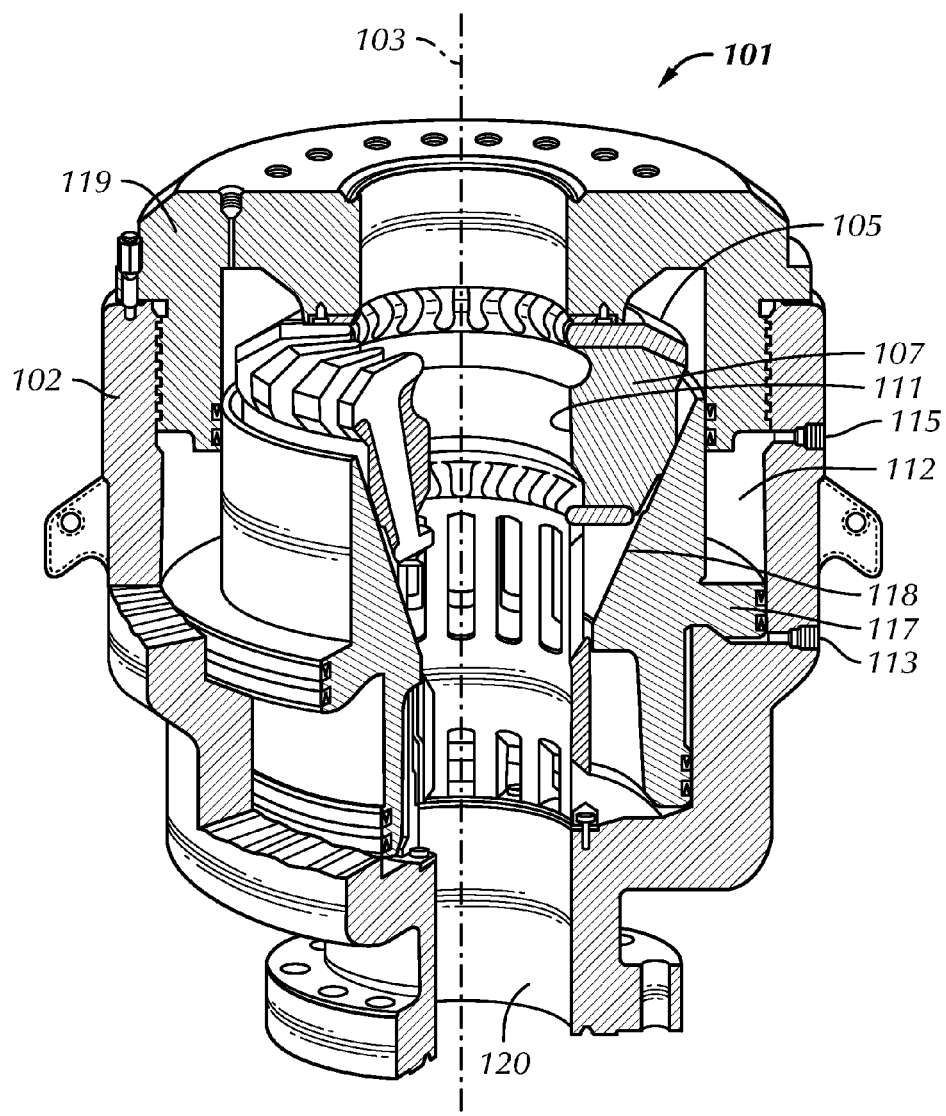
FIG. 1 is a schematic diagram of a conventional annular blowout preventer.
Figure 2:
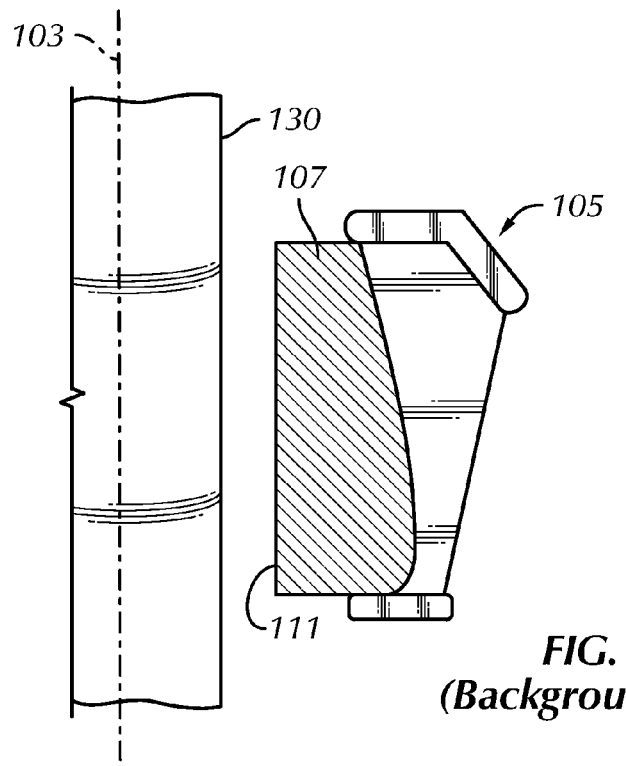
FIG. 2 is a schematic diagram of a section of a packing unit in an open position in an annular blowout preventer in accordance with embodiments disclosed herein.
Figure 3:
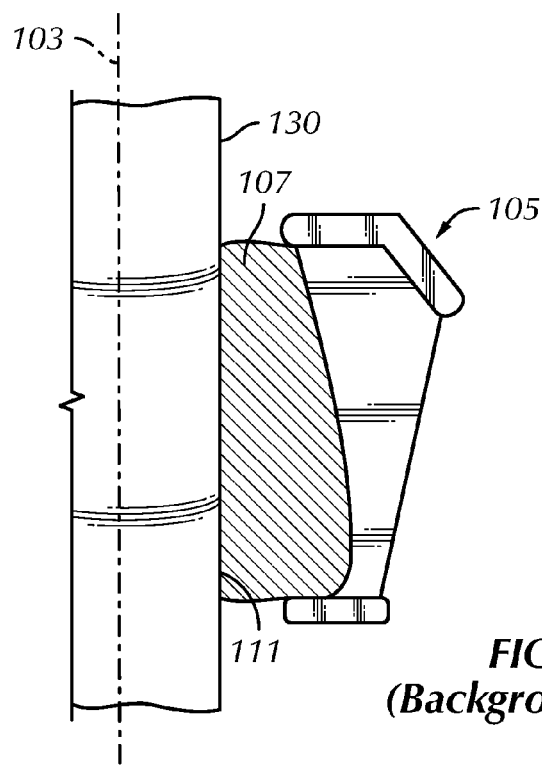
FIG. 3 is a schematic diagram of a section of a packing unit in a closed position in an annular blowout preventer in accordance with embodiments disclosed herein.
Figure 4:
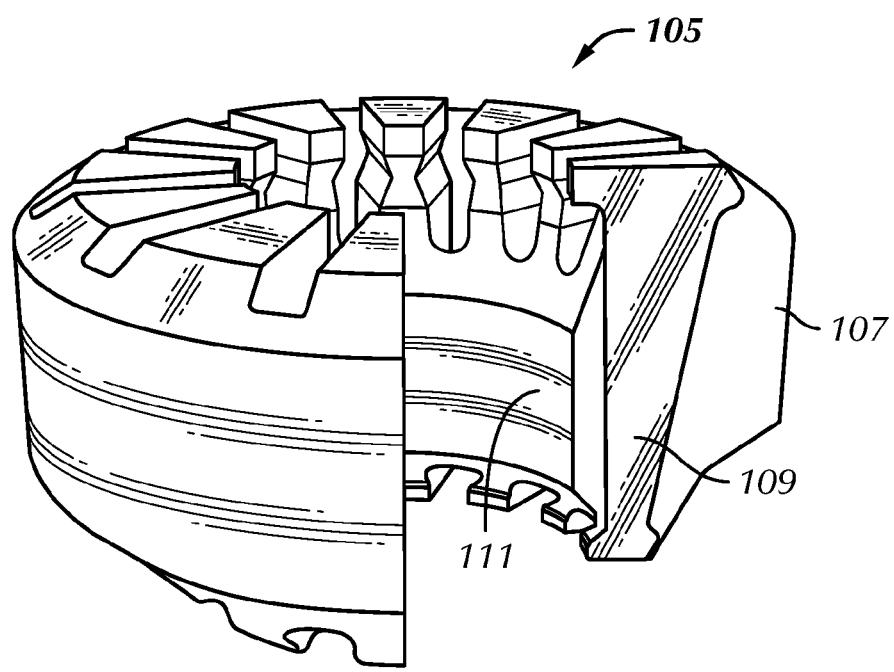
FIG. 4 is a schematic diagram of a packing unit in accordance with embodiments disclosed herein.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In accordance with embodiments disclosed herein, a packer unit for an annular blowout preventer includes an annular elastomer body including an elastomer having a unidirectional grain, and a quantity of fiber longitudinally aligned with the grain of the elastomer. Various materials for making a fiber reinforced elastomeric body of a packing unit of an annular BOP system may be used. Fiber reinforced elastomers may be used for BOP packers because they combine the elastic behavior of the rubber with the strength and stiffness of the reinforcing fiber. The fiber reinforced elastomer is a blend of an elastomeric material having a unidirectional grain and a quantity of fiber longitudinally aligned with the grain of the elastomer. The elastomeric material may be NBR which is a complex family of unsaturated copolymers of acrylonitrile and butadiene. By selecting an elastomer with the appropriate acrylonitrile content in balance with other properties, NBR can be used in a wide variety of application areas requiring oil, fuel, and chemical resistance. As used herein, "elastomeric material" refers to thermoplastics, thermosets, rubbers, and other polymeric compounds that exhibit elastic behavior and are commonly used for seals, o-rings, and the like.

NBR producers vary polymerization temperatures to make "hot" and "cold" polymers. Acrylonitrile (ACN) and butadiene (BD) ratios are varied for specific oil and fuel resistance and low temperature requirements. Specialty NBR polymers which contain a third monomer (e.g., divinyl benzene, methacrylic acid) are also offered. Some NBR elastomers are hydrogenated to reduce the chemical reactivity of the polymer backbone, improving heat resistance (e.g., HNBR). Each modification determines uniquely different properties.

Addition of carboxylic acid groups to the NBR polymer's backbone (XNBR) may alter processing and curing properties. The result is a polymer matrix with increased strength, measured by improved tensile strength, tear resistance, modulus and abrasion resistance. The negative effects include reduction in compression set, water resistance, resilience and some low-temperature properties.

In some embodiments, the elastomer may be a nitrile group-containing highly saturated copolymer rubber, a copolymer rubber between α,β-ethylenically unsaturated nitrile and conjugated diene and/or ethylenically unsaturated monomer, or its derivative. Other elastomers that can be used include, but are not limited to, natural rubber/polybutadiene rubber (PBD) blend, polyisoprene rubber (IR), styrene butadiene rubber (SBR), butyl and halobutyl rubbers (IIR, BIIR, CIIR), ethylene propylene rubbers (EPM, EPDM), crosslinked polyethylene (XLPE) and chloroprene rubbers (CR), nitrile rubbers (NBR), butadiene rubber, fluorocarbon elastomers (FKM) and blends or mixtures thereof.

The rubber can be obtained directly by copolymerizing the individual monomers. It can also be obtained by hydrogenating a nitrile group-containing unsaturated copolymer rubber. The polymerization method and hydrogenation method for obtaining the adherend rubber are not particularly restricted. Examples of adherend rubber may include highly saturated butadiene-acrylonitrile copolymer rubber, highly saturated isoprene-butadiene-acrylonitrile copolymer rubber, highly saturated isoprene-acrylonitrile copolymer rubber, highly saturated butadiene-methyl acrylate-acrylonitrile copolymer rubber, highly saturated butadiene-acrylic acid-acrylonitrile copolymer rubber, highly saturated butadiene-ethylene-acrylonitrile copolymer rubber, and butyl acrylate-ethoxyethyl acrylate-vinylnorbornene-acrylonitrile copolymer rubber. Furthermore, any existing compounds used in annular blowout protection devices may be used as the elastomeric compound.

Examples of fibers that may be oriented within the elastomer are those made of aramid, polyamide, polyester and polyolefins. Examples of specific fibers that can be oriented within the elastomer are nylon 6, nylon 46, nylon 66, polypropylene, polyethylene, polyethyleneterephthalate (PET) and polyethylenenaphthalate (PEN). Other types of fibers that can be used include glass fibers, steel fibers, cotton fibers, carbon fibers, rayon and acrylic fibers. Other suitable fibers will be apparent to those skilled in the art.

Other examples of liquid crystalline fibers that can be used include, but are not limited to: VECTRAN available from Hoechst-Celanese Corporation, USA (Dallas, Tex.), which is a fiber spun from a liquid crystalline melt of a rigid, rodlike aromatic copolyester whose molecular structure is made up of two monomers, namely p-hydroxybenzoic acid and 6-hydroxy-2 naphthoic acid, in a random sequence distribution, and in different molecular ratios; KEVLAR available from E.I. dupont de Nemours & Co., Inc., USA (Wilmington, Del.) and TWARON available from Akzo Nobel Fibers (Netherlands), are fibers spun from a liquid crystalline solution of a rigid, rodlike aromatic polyamide via the dry-jet (air-gap) wet spinning technique, made of poly (p-phenyleneterephthalamide); cellulosic fibers made by spinning liquid crystalline solutions of cellulose esters (formate or acetate) with subsequent saponification to yield regenerated cellulosic fibers; highly oriented, extended-chain crystalline fibers made from rigid-rod, aromatic heterocyclic polymers by a liquid crystalline solution spinning route, such as poly (p-phenylenebenzobisthiazole) or PBZT, and poly (p-phenylenebenzobisoxazole), known as PBZO.

These highly oriented, stiff-chain polymer fibers will fibrillate to a pulp-type product under mechanical shear forces. In addition, a highly branched fibrillated, high surface area pulp, similar to cellulosic and aramid pulps, can also be produced from short wet-spun acrylic (polyacrylonitrile) filaments by commercial mechanical processes.

Highly oriented aramid fibers can also be prepared by conventional spinning of an isotropic solution of an aromatic copolyamide, followed by drawing of the spun fibers at very high temperatures and draw ratios. A fiber of this type, copoly (p-phenylene/3,4$^1$-oxydiphenyleneterephthalamide), is made commercially by Teijin, Ltd., Japan, under the tradename TECHNORA, and can be converted to a pulp that can be used in the hybrid reinforcement composites disclosed herein.

Highly-oriented, extended-chain crystalline fibers can also be produced from flexible chain polymers by the gel spinning technique. Examples of this type of fiber are polyvinyl alcohol (PVA) fiber and some polyolefin fibers (e.g. polyethylene). In some embodiments, short length fibers having a surface treatment may be used to enhance the fiber dispersion in the elastomer mix and may improve the bonding between the fiber and the elastomer.

These fibers whether in a stiff or flexible chain, and whether made by a liquid crystalline or a conventional solvent spinning process or via gel spinning, have one common characteristic: a high degree of orientation. This ultra-high degree of orientation, and concomitant mechanical anisotropy, is the main microstructural feature responsible for the tendency of these fibers to undergo to a greater or lesser extent axial splitting and fibrillation under shear, yielding pulp-like products.

In some embodiments, RHENOGRAN aramid pulp P95-50/NBR (Rhein Chemie, Mannheim, Germany), a pre-treated chopped pulp of aramid fiber in 50% NBR binder may be used. Any of the existing annular compounds can be used as base compound. The load of fiber may range from about 0.5 to about 5 phr, from about 1.25 to about 3.75 phr, or from about 2.0 to about 3.0 phr. In some embodiments, the load may be extended to greater than 5 phr depending on the compound and packer size/type. The length of the fibers may range from about pulp size, 1 mm to about 15 mm, from about 4 mm to about 9 mm, or from about 6 mm to about 7 mm.

The fibers are mixed with the elastomer in a mixer. For example, the first pass may be controlled by mixing time and the final addition may be controlled by temperature. In some embodiments, the mixer is a Banbury model or something similar, known to one skilled in the art. Along with the fibers, other additives, including carbon black and other rubber additives may be added according to a prescribed procedure.

Figure 5:
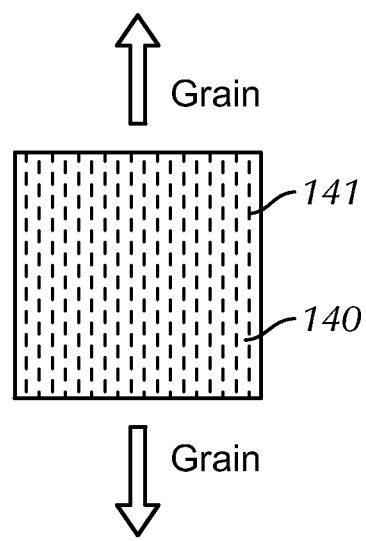
FIG. 5 is a schematic diagram of a molded slab having fibers orientated in the grain direction in accordance with embodiments disclosed herein.

The unidirectional orientation of rubber molecular chains or filler particles may occur during processing operations, such as, but not limited to milling, extrusion, or calendaring. The unidirectional orientation of rubber molecular chains or filler particles may provide anisotropy of the rubber vulcanizate. As shown in FIG. 5, after mixing, the fibers 141 may be oriented in a mill or an extruder, resulting in the mechanical anisotropy in a molded slab 140. The fibers 141 have an aspect ratio (length/diameter) and may be oriented in the grain direction after they are mixed into the rubber compound.

Figure 6:
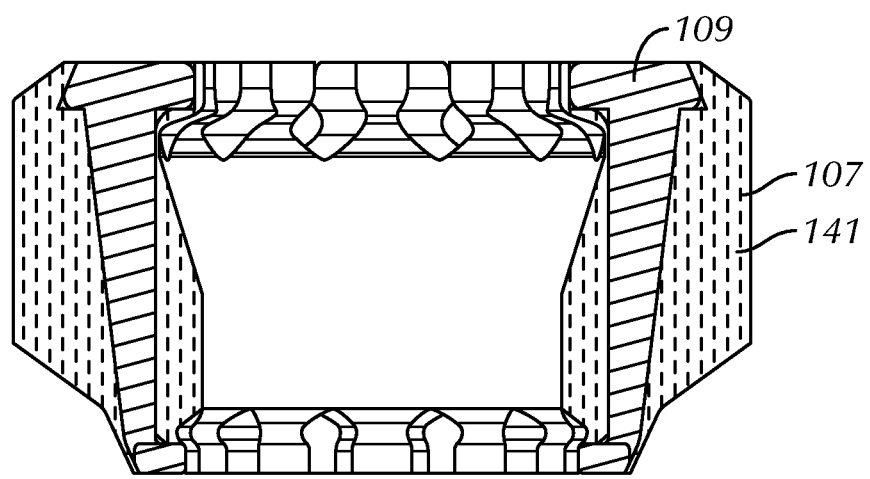
FIG. 6 is a schematic cross-sectional diagram of an annular blowout preventer having fibers oriented in the axial direction in accordance with embodiments disclosed herein.

In some embodiments, the grain of the elastomer may be substantially parallel to the longitudinal axis of the annular body. This may be accomplished by carefully laying out or inserting the fiber reinforced elastomer mix into an annular blowout preventer (ABOP) mold with the grain being kept in the axial direction. A cross section of an annular blowout preventer molded by this method is shown in FIG. 6. The fibers 141 in an elastomer matrix 107 may be aligned substantially parallel to the grain and annular axis.

To prepare the annular blowout preventer having the grain substantially parallel to the longitudinal axis of the annular body, the fiber reinforced elastomer mix may be milled In other embodiments, the fiber reinforced elastomer mix may be extruded or calendared. After the elastomers are milled, calendared or extruded, they may be cut or formed into specific shapes to be put into a mold. For example, after milling, a first set of prep straps may be sheeted off longitudinally parallel to the mill direction. These will be termed prep strap-A. Multiple layers of prep strap-A may be cut and loaded into the mold between metal inserts in the way that the mill direction is parallel to the packer axis. A second set of prep straps, termed prep strap-B, may be sheeted off from the mill perpendicular to the mill direction, and wrapped onto the mold longitudinally perpendicular to the mold axis so that the grain is parallel to the packer axis. In some embodiments, the mold may be preheated to a predetermined temperature. For example, the mold may be preheated to about 250° F. When the mold is closed, the top half of the mold may push the compound flow downwards. The compound is allowed to cure. The cure condition may be 2 hours at about 250° F., and then 2.5 hours at about 275° F., followed by 9 hours at about 295° F. One of ordinary skill in the art will appreciate that the conditions of the process, e.g., temperature, time, pressure, may be varied based on the size of the packer and the compounds used in the packers.

EXAMPLES

To study the fiber reinforcement and its directional physical properties when used in elastomer compounds as applied to annular blowout preventer applications, a base rubber compound (Compound A), which is a NBR annular blowout preventer compound was mixed with both polyester and aramid fibers. The fiber lengths ranged from chopped pulps of about 4 mm and about 9 mm and the loading ranged from about 1 to about 15 parts per hundred of rubber (phr). Tensile strength, elongation, modulus and tear properties were tested in both directions of normal (with) and transverse (across) the grain.

Various batches with varying amounts and types of fiber were mixed via a 72 in$^3$ lab Banbury mixer. The batches included Perbunan 3481 synthetic rubber available from Lanxess, (Pittsburgh, Pa.), polyester fibers from Finite Fiber Company (Akron, Ohio), aramid fibers RHENOGRAN aramid pulp P95 50% NBR available from Rhein Chemie (Mannheim, Germany), N231 CARBON BLACK available from Sid Richardson Carbon (Ft. Worth, Tex.), N550 CARBON BLACK available from Continental Carbon (Houston, Tex.), HI SIL™ 243-LD amorphous silica available from PPG Industries Inc. (Monroeville, Pa.), MC98-Sulfur available from Akrochem (Akron, Ohio), HYD#4 Preweigh available from Elite Solutions (Ripley, Miss.), MBTS-75 (75% active dibenzothiazole disulfide available from Akrochem (Akron, Ohio), PB(TETD)-75 (75% active lead tetraethyl thiruam disulfide) available from Rhein Chemie (Mannheim, Gennany), WB222 PROCESS AID available from Struktol (Stow, Ohio).

The mixing procedure is shown in Table 1. A first pass was controlled by mixing time, while the final mixing was controlled by temperature. After the first pass and the final pass, the compounds were dumped from the Banbury and sheeted off from a 12 in lab two-roll mill. The ASTM sheets were compression molded in a 15 in×15 in press with 30 tons of ram pressure. The cure time and temperature were 15 minutes at 320° F. The physical tests followed the ASTM standards and used the equipment listed in Table 2. There were two lots of mixing carried out in this study with eight compounds per lot. The formulations and physical properties are listed in Tables 3 and 4 for the mixing Lots-1 and 2, respectively. The materials of examples 1 and 9 are identical, and are the base rubber compound (Compound A) used as the control.

TABLE 1

| Mixing Procedure | |
|---|---|
| Minutes | Ingredients |
| 1$^{st}$ Pass | |
| 0 | Polymers + Fibers |
| 1.5 | ½ Fillers |
| 2.5 | ½ Fillers |
| 3.5 | Chemicals |
| 4 | Sweep |
| 6 | Dump |
| Final Pass | |
| 0 | ½ Master Batch |
|  | Curatives |
|  | ½ Master Batch |
|  | Dump @ 200° F. |

TABLE 2

| List of ASTM standards and Equipments Used for the Physical Tests | | |
|---|---|---|
| Test | ASTM # | Equipment Manufacturer and Model |
| Hardness | D2240 | PTC Instruments, Model 306L |
| Tensile Strength | D412 | Instron, Model 4444 |
| Tear Strength | D 624 | Instron, Model 4444 |

TABLE 3

Formulations and Physicals of Fiber Reinforced Nitrile Compounds, Mixing

| Example | 1 | | 2 | | 3 | | 4 | |
|---|---|---|---|---|---|---|---|---|
| First Pass | | | | | | | | |
| Perbunan 3481 NT | 100 | | 100 | | 100 | | 100 | |
| 4 mm Polyester Fiber | | | 5 | | 10 | | 15 | |
| 9 mm Polyester Fiber | | | | | | | | |
| RhenogranP95 50% NBR | | | | | | | | |
| MC-98 Sulfur | 2 | | 2 | | 2 | | 2 | |
| HiSil 243 | 15 | | 15 | | 15 | | 15 | |
| N231 Carbon Black | 32 | | 32 | | 27 | | 25 | |
| N550 Carbon Black | 32 | | 27 | | 27 | | 25 | |
| HYD #4 Preweigh | 25 | | 25 | | 25 | | 25 | |
| WB222 Process Aid | | | | | | | | |
| Final Pass | | | | | | | | |
| MBTS-75 | 2.14 | | 2.14 | | 2.14 | | 2.14 | |
| PB(TETD)-75 | 0.14 | | 0.14 | | 0.14 | | 0.14 | |
| WB222 Process Aid | 0.5 | | 0.5 | | 0.5 | | 0.5 | |
| TOTAL | 208.78 | | 210.78 | | 210.78 | | 211.78 | |
| Physical Property | wGrain | xGrain | wGrain | xGrain | wGrain | xGrain | wGrain | xGrain |
| Durometer (Shore A) | 80 | | 80 | | 84 | | 84 | |
| Tensile strength (psi) | 3431 | 3304 | 2961 | 2627 | 2588 | 2221 | 2117 | 1737 |
| Elongation (%) | 631 | 618 | 499 | 551 | 511 | 578 | 389 | 496 |
| M25 (psi) | 234 | 235 | 454 | 252 | 576 | 252 | 1389 | 314 |
| M50 (psi) | 291 | 288 | 653 | 320 | 833 | 315 | 1279 | 410 |
| M100 (psi) | 410 | 392 | 802 | 431 | 969 | 408 | 1220 | 539 |
| M300 (psi) | 1690 | 1569 | 1785 | 1279 | 1504 | 1062 | 1657 | 1108 |

| Example | 5 | | 6 | | 7 | | 8 | |
|---|---|---|---|---|---|---|---|---|
| First Pass | | | | | | | | |
| Perbunan 3481 NT | 100 | | 100 | | 97.5 | | 95 | |
| 4 mm Polyester Fiber | | | | | | | | |
| 9 mm Polyester Fiber | 5 | | 15 | | | | | |
| RhenogranP95 50% NBR | | | | | 5 | | 10 | |
| MC-98 Sulfur | 2 | | 2 | | 2 | | 2 | |
| HiSil 243 | 15 | | 15 | | 15 | | 15 | |
| N231 Carbon Black | 32 | | 25 | | 32 | | 32 | |
| N550 Carbon Black | 27 | | 25 | | 29.5 | | 27 | |
| HYD #4 Preweigh | 25 | | 25 | | 25 | | 25 | |
| WB222 Process Aid | | | | | | | | |
| Final Pass | | | | | | | | |
| MBTS-75 | 2.14 | | 2.14 | | 2.14 | | 2.14 | |
| PB(TETD)-75 | 0.14 | | 0.14 | | 0.14 | | 0.14 | |
| WB222 Process Aid | 0.5 | | 0.5 | | 0.5 | | 0.5 | |
| TOTAL | 210.78 | | 211.78 | | 208.78 | | 208.78 | |
| Physical Property | wGrain | xGrain | wGrain | xGrain | wGrain | xGrain | wGrain | xGrain |
| Durometer (Shore A) | 85 | | 85 | | 83 | | 85 | |
| Tensile strength (psi) | 2981 | 2305 | 1332 | 1565 | 3082 | 2822 | 2609 | 2557 |
| Elongation (%) | 654 | 640 | 324 | 480 | 757 | 828 | 642 | 744 |
| M25 (psi) | 638 | 270 | 1181 | 336 | 339 | 244 | 384 | 288 |
| M50 (psi) | 782 | 337 | 1236 | 450 | 633 | 311 | 695 | 385 |
| M100 (psi) | 887 | 461 | 1153 | 590 | 886 | 431 | 1189 | 559 |
| M300 (psi) | 1734 | 1077 | | 1105 | 1573 | 1089 | 1756 | 1215 |

TABLE 4

Formulations and Physicals of Fiber Reinforced Nitrile Compounds Based on Compound A

| Example | 9 | 10 | 11 | 12 |
|---|---|---|---|---|
| First Pass | | | | |
| Perbunan 3481 NT | 100 | 98.75 | 97.5 | 96.25 |
| 4 mm Polyester Fiber | | | | |
| 9 mm Polyester Fiber | | | | |
| RhenogranP95 50% NBR | | 2.5 | 5 | 7.5 |
| MC-98 Sulfur | 2 | 2 | 2 | 2 |
| HiSil 243 | 15 | 15 | 15 | 15 |
| N231 Carbon Black | 32 | 32 | 30 | 27 |

TABLE 4-continued

Formulations and Physicals of Fiber Reinforced Nitrile Compounds Based on Compound A

| | | | | | | | | |
|---|---|---|---|---|---|---|---|---|
| N550 Carbon Black | 32 | | 27 | | 27 | | 27 | |
| HYD #4 Preweigh | 25 | | 25 | | 25 | | 25 | |
| WB222 Process Aid | 0.5 | | 0.5 | | 2 | | 0.5 | |
| Final Pass | | | | | | | | |
| MBTS-75 | 2.14 | | 2.14 | | 2.14 | | 2.14 | |
| PB(TETD)-75 | 0.14 | | 0.14 | | 0.14 | | 0.14 | |
| TOTAL | 208.78 | | 205.03 | | 205.78 | | 202.53 | |
| Physical Property | wGrain | xGrain | wGrain | xGrain | wGrain | xGrain | wGrain | xGrain |
| Durometer (Shore A) | 80 | | 80 | | 80 | | 80 | |
| Tensile strength (psi) | 3466 | 3158 | 3306 | 3171 | 2967 | 2886 | 2902 | 2689 |
| Elongation (%) | 530 | 537 | 665 | 725 | 667 | 784 | 663 | 734 |
| M25 (psi) | 283 | 270 | 325 | 288 | 329 | 286 | 527 | 294 |
| M50 (psi) | 353 | 333 | 470 | 353 | 497 | 340 | 881 | 359 |
| M100 (psi) | 521 | 457 | 745 | 507 | 878 | 473 | 1210 | 539 |
| M300 (psi) | 2112 | 1759 | 1915 | 1607 | 1747 | 1174 | 1735 | 1279 |
| Tear strength (lb/in) | 317 | 300 | 325 | 327 | 286 | 321 | 258 | 359 |

| Example | 13 | | 14 | | 15 | | 16 | |
|---|---|---|---|---|---|---|---|---|
| First Pass | | | | | | | | |
| Perbunan 3481 NT | 95 | | 100 | | 100 | | 100 | |
| 4 mm Polyester Fiber | | | | | | | 3 | |
| 9 mm Polyester Fiber | | | 5 | | 3 | | | |
| RhenogranP95 50% NBR | 10 | | | | | | | |
| MC-98 Sulfur | 2 | | 2 | | 2 | | 2 | |
| HiSil 243 | 15 | | 15 | | 15 | | 15 | |
| N231 Carbon Black | 25 | | 30 | | 32 | | 32 | |
| N550 Carbon Black | 25 | | 20 | | 22 | | 27 | |
| HYD #4 Preweigh | 25 | | 25 | | 25 | | 25 | |
| WB222 Process Aid | 0.5 | | 2 | | 2 | | 2 | |
| Final Pass | | | | | | | | |
| MBTS-75 | 2.14 | | 2.14 | | 2.14 | | 2.14 | |
| PB(TETD)-75 | 0.14 | | 0.14 | | 0.14 | | 0.14 | |
| TOTAL | 199.78 | | 201.28 | | 203.28 | | 208.28 | |
| Physical Property | wGrain | xGrain | wGrain | xGrain | wGrain | xGrain | wGrain | xGrain |
| Durometer (Shore A) | 80 | | 79 | | 78 | | 78 | |
| Tensile strength (psi) | 2734 | 2650 | 3141 | 2329 | 2974 | 2454 | 3308 | 2962 |
| Elongation (%) | 659 | 774 | 714 | 677 | 709 | 672 | 766 | 778 |
| M25 (psi) | 508 | 311 | 808 | 306 | 446 | 315 | 447 | 317 |
| M50 (psi) | 872 | 389 | 877 | 351 | 594 | 360 | 554 | 363 |
| M100 (psi) | 1307 | 534 | 936 | 432 | 751 | 448 | 700 | 450 |
| M300 (psi) | 1772 | 1210 | 1498 | 929 | 1330 | 1008 | 1399 | 1036 |
| Tear strength (lb/in) | 340 | 388 | 268 | 377 | 327 | 354 | 304 | 342 |

Figure 7:
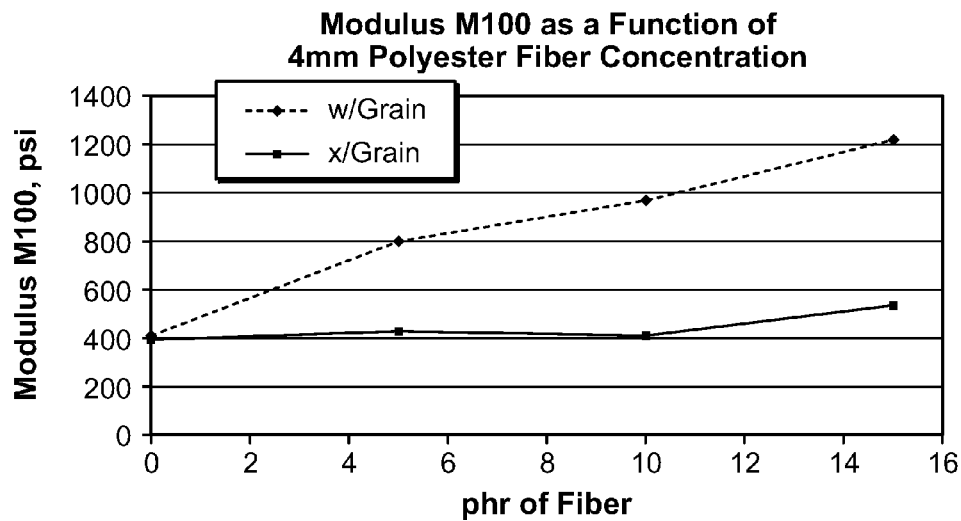
FIG. 7 is a graph of Modulus M100 as a function of 4 mm Polyester Fiber Concentration in accordance with embodiments disclosed herein.

In Examples 2 through 4, 4 mm polyester fibers were added with increasing concentration from 5 phr to 15 phr. As shown in FIG. 7, the change in modulus M100 across the grain direction is negligible with the addition of fibers. However, the modulus increases dramatically in the direction with the grain; 100% increase with 5 phr of the fiber, and almost 200% increase with 15 phr of the fiber. Tensile strength (FIG. 8) and elongation (FIG. 9) decrease with the increase of the fiber concentration. At a certain fiber parts per hundred rubber, the decrease of tensile strength across the grain is greater than that with the grain, but vice versa for the decrease of elongation. In other words, the 4 mm polyester fibers make the NBR vulcanizate anisotropic. Specifically, the 4 mm polyester fibers increase the modulus and tensile strength but lower elongation of the NBR vulcanizate with the grain as compared to those properties across the grain.

Figure 10:
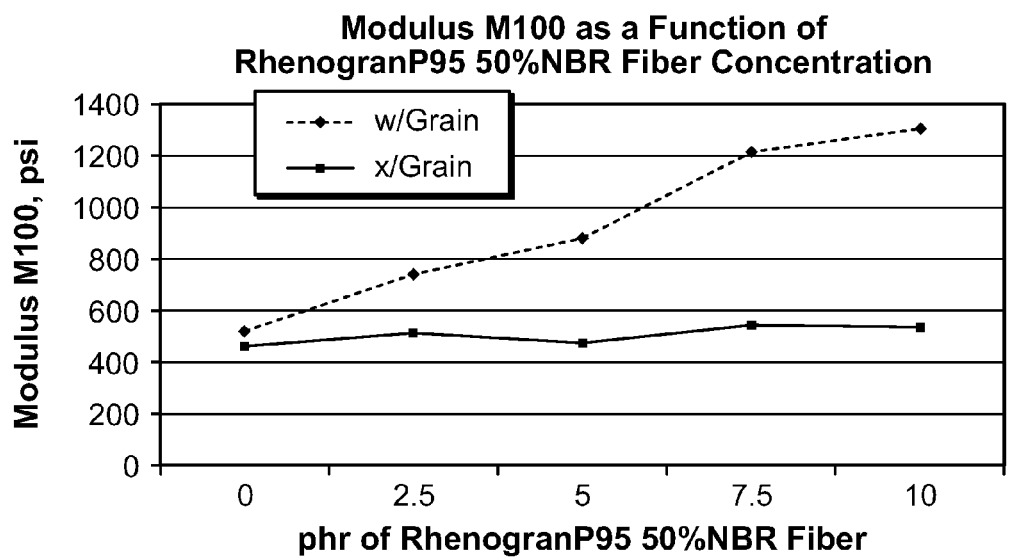
FIG. 10 is a graph of Modulus M100 as a function of RHENOGRAN P95 50% NBR Fiber Concentration in accordance with embodiments disclosed herein.

From Examples 10 through 13, RHENOGRAN P95 50% NBR fibers are added and the concentration increases from 2.5 phr to 10 phr. RHENOGRAN P95 50% NBR is 50% NBR bonded chopped pulp aramid fibers. The pretreatment with NBR is to improve fiber dispersion during mixing. So for every one part of RHENOGRAN P95 50% NBR fibers added to the compound, the actual fiber added is half part. As shown in FIG. 10, the modulus with the grain increases dramatically with the addition of aramid fibers, while the modulus across the grain increases very slightly. In other words, the anisotropy of stiffness increases significantly with the addition of aramid fiber, even when the fiber concentration is very low.

Here for ease of analysis, a parameter of "Anisotropy Index of Modulus $M_{100}$ ($I_{M100}$)" is defined as the ratio of the modulus $M_{100}$ with the grain over the modulus $M_{100}$ across the grain, that is:

$$I_{M100} = M_{100}(w\text{-Grain})/M_{100}(x\text{-Grain})$$

For a completely isotropic vulcanizate, $I_{M100}$ should equal 1. For fiber filled vulcanizates, the greater the $I_{M100}$, the higher the anisotropy.

In Example 9, $I_{M100}$ equals 521/457=1.1. Example 9 is a no fiber added control compound; the slight anisotropy results from the "regular grain", that is, from the orientation of polymer chains and carbon black fillers.

In Example 10, with 2.5 phr 50% NBR bonded aramid fibers (1.25 phr of pure fibers), $I_{M100}$ increases to 745/507=1.5. In Example 13, with 10 phr 50% NBR bonded aramid fibers (5 phr of pure fibers), $I_{M100}$ increases to 1307/534=2.5.

Figure 8:
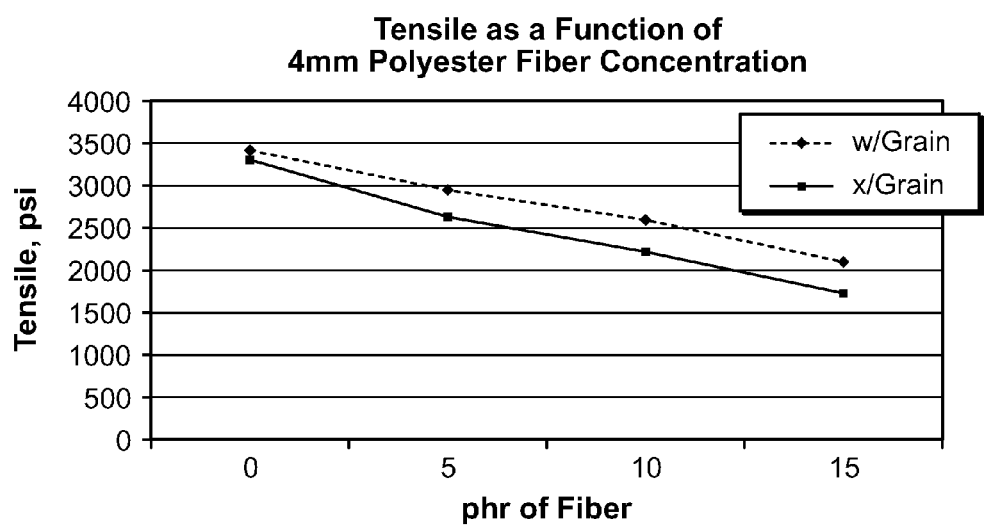
FIG. 8 is a graph of tensile strength as a function of 4 mm Polyester Fiber Concentration in accordance with embodiments disclosed herein.
Figure 9:
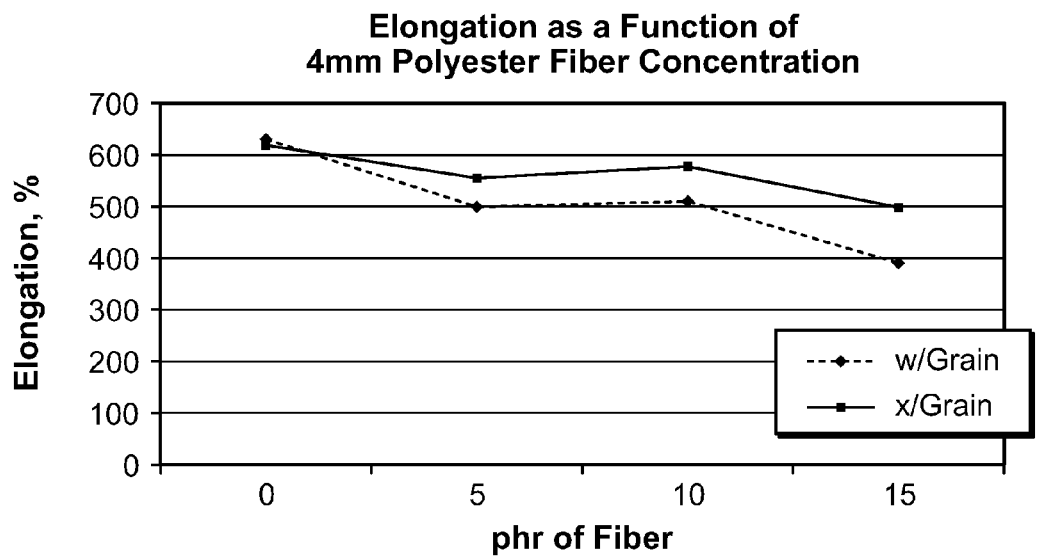
FIG. 9 is a graph of Elongation as a function of 4 mm Polyester Fiber Concentration in accordance with embodiments disclosed herein.
Figure 11:
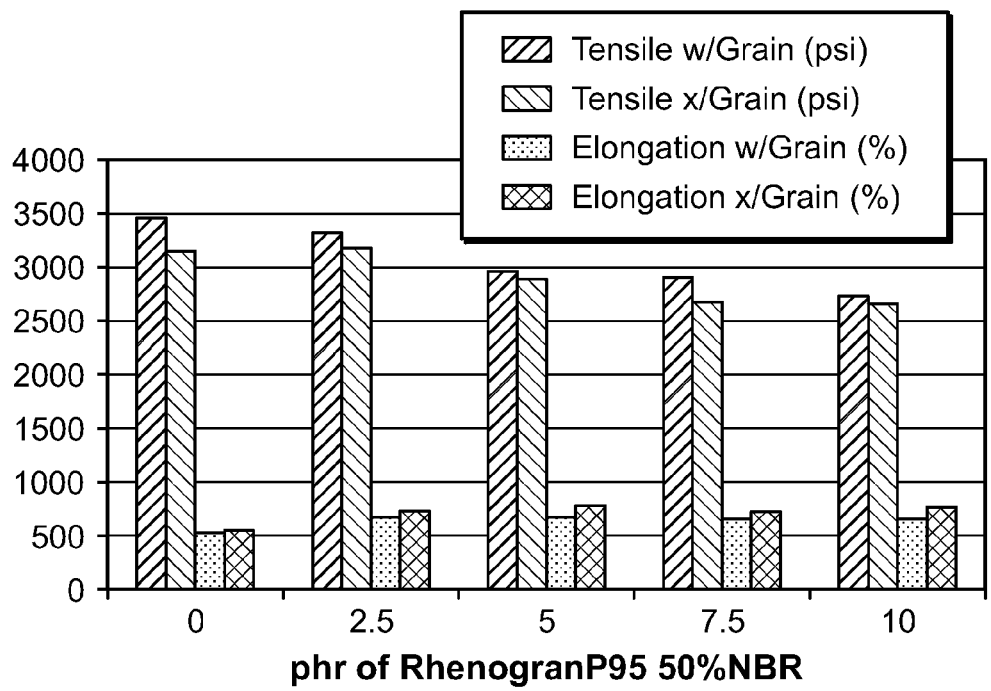
FIG. 11 is a graph of tensile strength and Elongation (%) with & across the grain vs. Pulp Aramid Fiber Concentration in accordance with embodiments disclosed herein.

FIG. 11 shows the changes of tensile strength and elongation with increasing concentration of aramid fibers. The tensile strength is decreased with the increase of the aramid fiber concentration, which is similar to results for 4 mm polyester fibers (FIG. 8). However, with the addition of pulp aramid fibers, the elongation increases slightly unlike with polyester fibers (FIG. 9).

Figure 12:
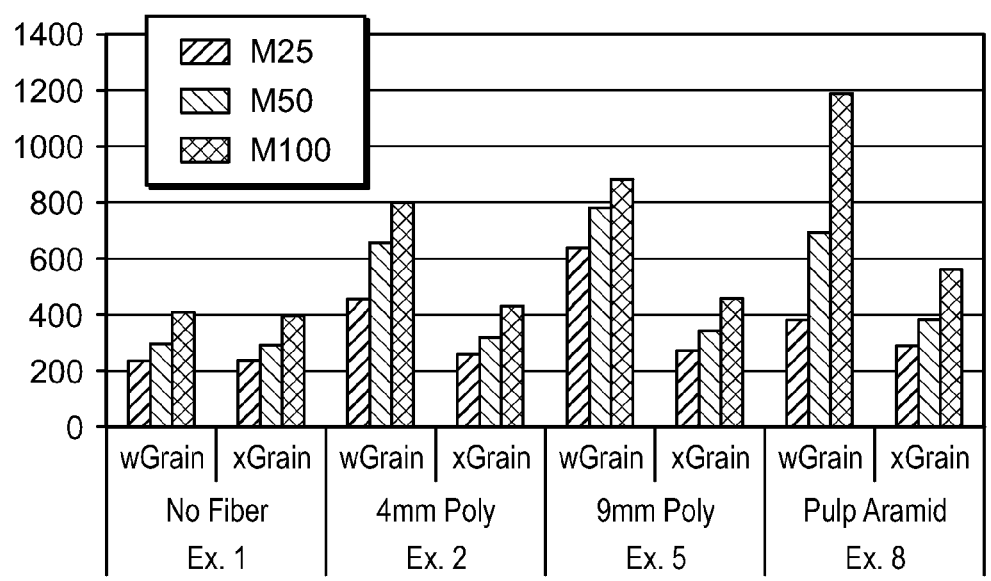
FIG. 12 is a graph of Modulus Comparisons between different fibers with the same concentration (5 phr Fiber) in accordance with embodiments disclosed herein.

FIG. 12 shows the modulus comparisons between different fibers with the same concentration of 5 phr. The two polyester fibers, either 4 mm or 9 mm long, increase the moduli across the grain very slightly if any. In the direction with the grain, the increase of the moduli from 9 mm polyester fibers is greater than that from the 4 mm polyester fibers. The pulp fiber compound has higher moduli than polyester fibers in the direction across the grain.

In the direction with the grain, the low strain moduli like M25 and M50 of pulp aramid fiber compound are lower than those of polyesters, while the M100 of aramid compound is higher than polyesters.

Figure 13:
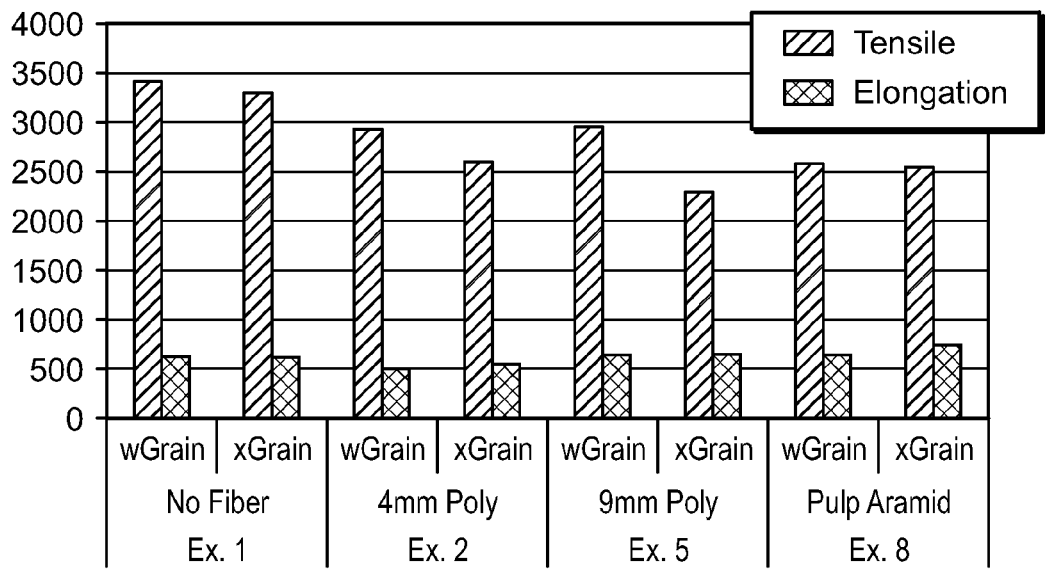
FIG. 13 is a graph of tensile strength and Elongation (%) between different fibers with the same concentration (5 phr Fiber) in accordance with embodiments disclosed herein.

FIG. 13 shows the comparisons of tensile strength and elongation. The tensile strength is decreased for all tested fibers in both directions, i.e., with and across the grain. Pulp aramid and 9 mm polyester fibers increase elongation, while 4 mm polyester fibers decrease elongation.

Figure 14:
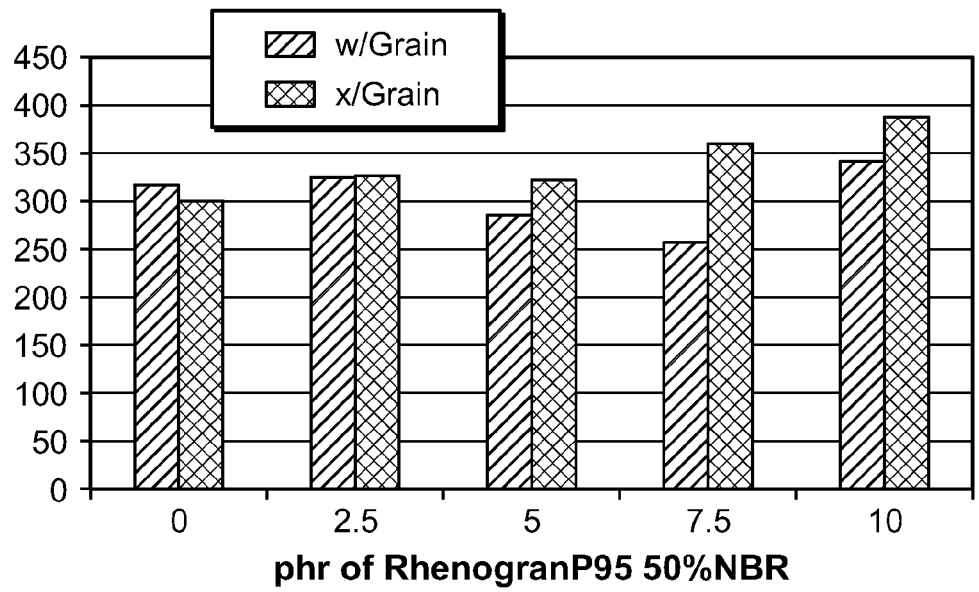
FIG. 14 is a graph of tear strength with & across the grain vs. Pulp Aramid Fiber Concentration in accordance with embodiments disclosed herein.

The last row of Table 4 lists the tear strengths of Examples 9 through 16. For the fiber filled samples, the tear strength across the grain is higher than that with the grain. For example, FIG. 14 shows the tear behaviors of pulp aramid fiber filled compounds. The difference of tear strength between two directions (with and across the grain) is much less than the difference of modulus.

The addition of 4 mm and 9 mm polyester fibers or NBR bonded pulp aramid fibers provided modulus enhancement and anisotropy to the NBR. Compared to a control NBR compound (Example 1), the fiber reinforced compound has similar modulus across the grain, and significantly increased modulus with the grain. Therefore, anisotropic fiber reinforcement may benefit BOP applications. Properly laying two-roll milled fiber filled elastomer sheets into a BOP mold to provide the mill grain parallel to the axis will provide an anisotropic BOP unit, that is, the BOP will have regular modulus across the grain or axis, but will be much stiffer with the grain or axis. The flexibility across the axis will allow the BOP elastomer to close with less pressure to seal the wellbore, while the stiffness with axis will help to resist extrusion.

Conventional strategies to increase modulus, e.g., increasing carbon black loading or increasing crosslink density (cure state), usually result in loss of elongation. Directional modulus enhancement can be achieved by pulp aramid fiber reinforcement without the sacrifice of elongation.

As shown above, it is desirable to provide a fiber reinforced anisotropic packer in which the orientation of the reinforcing fiber is parallel to the packer axis. The elastomer composite in the packer formed in accordance with embodiments disclosed herein is stiff in axial direction to resist extrusion under wellbore pressure, yet soft across the axis so that it is flexible for closing.

The following examples focus on the reinforcement of the chopped pulp sized aramid fiber. A standard GX11-5 annular compound, compound B, was used as a base compound, and the addition of RHENOGRAN P95 50% NBR varied from 0 to 10 phr, forming an "Aramid Series." A pre-mix batch was mixed in a 220 liter Banbury mixer. The pre-mix batch included NIPOL DN 1201 elastomer available from Zeon Chemicals L.P. (Louisville, Ky.), N326 CARBON BLACK available from Continental Carbon (Houston, Tex.), N660 CARBON BLACK available from Continental Carbon (Houston, Tex.), HI SIL™ 243-LD amorphous silica available from PPG Industries Inc. (Monroeville, Pa.), TMQ stearically hindered amine available from Western Reserve Chemical (Stow, Ohio), SANTOFLEX 13 antioxidant available from Flexsys America L.P. (Akron, Ohio), SP25 TACKIFIER RESIN available from SI Group Inc. (Schenectady, N.Y.), STEARIC ACID available from Hallstar (Chicago, Ill.), DIDP EZ MIX available from Hallstar (Chicago, Ill.), ZnO911C-85/NBR/S available from Akrochem (Akron, Ohio), and WB222 PROCESS AID available from Struktol (Stow, Ohio). The formulation of the pre-mix batch is shown in Table 5, and its mixing procedure is shown in Table 6.

TABLE 5

Formulation of Pre-mix Batch

| Description | phr |
|---|---|
| NIPOL DN 1201 | 100 |
| N326 CARBON BLACK | 12 |
| N660 CARBON BLACK | 25 |
| HI SIL 243-LD | 15 |
| TMQ | 3 |
| SANTOFLEX 13 | 1 |
| SP25 TACKIFIER RESIN | 5 |
| STEARIC ACID | 0.5 |
| DIDP EZ MIX | 13.2 |
| ZnO911C-85/NBR/S | 5 |
| WB222 PROCESS AID | 1.5 |
| Total: | 181.2 |

TABLE 6

Production Pre-mix Batch Mixing Procedure

| Minute | Temp | Ingredients |
|---|---|---|
| 0 | | 20 RPM, Rubber, ZnO |
| 2 | | Chemicals and Hi Sil |
| 3.3 | | Sweep and Balance |
| | 230° F. | Sweep |
| | 240° F. | Dump |

Using the pre-mix batch, sample lab batches of elastomer and fiber were mixed in a 72 in$^3$ lab internal mixer. The mixing procedure is shown in Table 7, and the formulations are shown in Table 8. The sample batches included the pre-mix batch and RHENOGRAN P95 50% NBR available from Rhein Chemie (Mannheim, Germany), N660 CARBON BLACK available from Continental Carbon (Houston, Tex.), and DIDP EZ MIX available from Hallstar (Chicago, Ill.). Also added were MC-98 Sulfur available from Akrochem (Akron, Ohio), MBTS-75 available from Akrochem (Akron, Ohio), and PB (TETD) 75 available from Rhein Chemie (Mannheim, Germany).

TABLE 7

Aramid Batch Mixing Procedure

| Minute | Ingredients |
|---|---|
| 1$^{st}$ Pass | |
| 0 | Pre-mix Batch, Fiber, Carbon Black |
| 3 | Plasticizer |

TABLE 7-continued

Aramid Batch Mixing Procedure

| Minute | Ingredients |
|---|---|
| 4 | Sweep |
| 6 | Dump |
| Final Pass | |
| 0 | ½ MB, Cure, ½ MB |
| | Dump @ 200° F. |

TABLE 8

Formulations of Aramid Series

| Example | 17 | 18 | 19 | 20 | 21 | 22 | 23 | 24 |
|---|---|---|---|---|---|---|---|---|
| | phr | phr | phr | phr | phr | phr | phr | phr |
| Pre-mix Batch | 181.2 | 181.2 | 181.2 | 181.2 | 181.2 | 181.2 | 181.2 | 181.2 |
| RHENOGRAN P95 50% NBR | | 2.5 | 5.0 | 7.5 | 10.0 | 15.0 | 20.0 | 10.0 |
| N660 Carbon black | 10.0 | 7.0 | 3.0 | | | | | |
| DIDP EZ mix plasticizer | | | | 4.0 | 8.0 | 12.0 | 4.0 | |
| MB Total | 191.2 | 190.7 | 189.2 | 188.7 | 195.2 | 204.2 | 213.2 | 195.2 |
| MC-98 Sulfur | 2.0 | 2.0 | 2.0 | 2.0 | 2.0 | 2.0 | 2.0 | 2.0 |
| MBTS-75 | 2.0 | 2.0 | 2.0 | 2.0 | 2.0 | 2.0 | 2.0 | 2.0 |
| PB (TETD) 75 | 0.2 | 0.2 | 0.2 | 0.2 | 0.2 | 0.2 | 0.2 | 0.2 |
| Total | 195.4 | 194.9 | 193.4 | 192.9 | 199.4 | 208.4 | 217.4 | 199.4 |

The compounds were milled in the 12 in lab mill for 3 minutes and then sheeted off in about 2 mm thickness. The ASTM sheets and compression set buttons were compression molded in a 15 in×15 in press with 30 tons of ram pressure. The cure time and temperature for ASTM sheets were 15 minutes at 320° F., while those for the compression set buttons were 45 minutes at 320° F. The Mooney viscosity and Moving Die Rheometer (MDR) tests followed ASTM standards and used the equipment as listed in Table 9.

TABLE 9

List of ASTM Standards and Equipments Used for the MV & MDR Tests

| Test | ASTM # | Equipment Manufacture and Model |
|---|---|---|
| Mooney Viscosity | D 1646 | Monsanto, Mooney Viscometer |
| MDR | D 5289 | Tech Pro, rheo Tech MDPT |

The Mooney viscosity was tested as ML 1+4(212° F.), that is, Mooney Large rotor used, 1 minute preheated, 4 minutes after starting the motor at which the reading was taken, and testing temperature of 212° F. The MDR rheometer was tested for 5 minutes at temperature of 350° F.

The physical tests followed ASTM standards and used the equipment as listed in Table 10.

TABLE 10

List of ASTM Standards and Equipments Used for the Physical Tests

| Test | ASTM # | Equipment Manufacture and Model |
|---|---|---|
| Hardness | D 2240 | PTC Instruments, Model 306L |
| Tensile Strength | D 412 | Instron, Model 4444 |
| Tear Strength | D 624 | Instron, Model 4444 |
| Compression Set | D 395 | Despatch, Hot Air Oven |

The Mooney viscosity and cure characteristics are presented in Table 11. The phr (part per hundred parts of rubber) load of aramid fiber in Table 11 is the concentration of pure aramid fiber. Because the fiber used in this test is RHENOGRAN P95 50% NBR, every part of RHENOGRAN (in Table 8) contains 0.5 part of pure aramid fiber (in Tables 11, 12, and 13). The pure fiber concentration is used in the following discussions. Example 1 is the control compound, which is a typical production compound for annular BOPs such as, GX11-5, i.e., compound B. Examples 21 and 24 are identical in formulation in order to determine the repeatability of this experiment. Comparing the Mooney viscosity and MDR results between Examples 21 and 24, good repeatability of this mixing series can be seen.

TABLE 11

Mooney viscosity and cure characteristics of Aramid Series

| Example | 17 | 18 | 19 | 20 | 21 | 22 | 23 | 24 |
|---|---|---|---|---|---|---|---|---|
| Aramid Fiber, phr | 0.00 | 1.25 | 2.5 | 3.75 | 5.00 | 7.50 | 10.00 | 5.00 |
| ML (1 + 4, 212° F.) | 43.7 | 41.3 | 41.0 | 38.7 | 36.3 | 35.4 | 33.4 | 36.1 |
| MDR, 350° F. | | | | | | | | |
| Tc 90 | 1.69 | 1.57 | 1.58 | 1.63 | 1.71 | 1.68 | 1.66 | 1.67 |
| Ts2 | 0.80 | 0.78 | 0.79 | 0.83 | 0.89 | 0.87 | 0.87 | 0.87 |
| MH | 9.04 | 9.12 | 9.02 | 8.08 | 8.05 | 8.79 | 9.16 | 8.06 |
| ML | 0.98 | 0.93 | 0.93 | 0.88 | 0.88 | 0.93 | 0.88 | 0.86 |
| Delta Torque | 8.06 | 8.19 | 8.09 | 7.20 | 7.17 | 7.86 | 8.28 | 7.20 |

Figure 15:
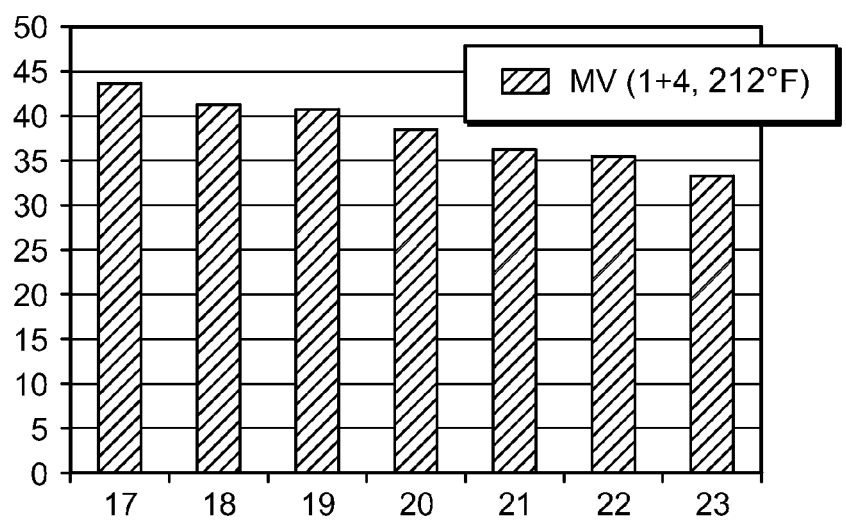
FIG. 15 is a graph of Mooney Viscosity for Aramid series in accordance with embodiments disclosed herein.
Figure 16:
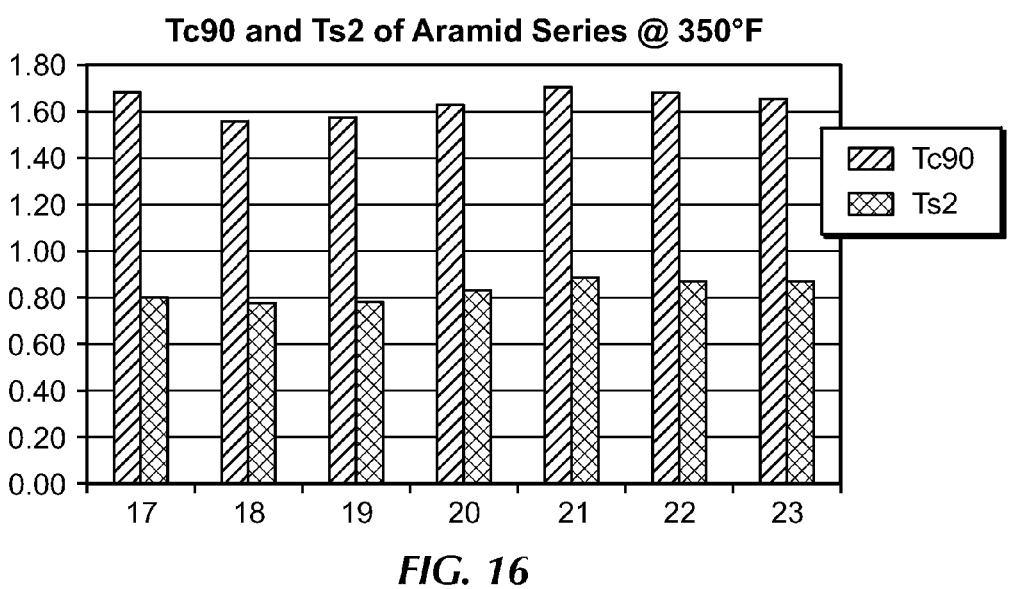
FIG. 16 is a graph of Tc90 and Ts2 for Aramid series at 350° F. in accordance with embodiments disclosed herein.
Figure 17:
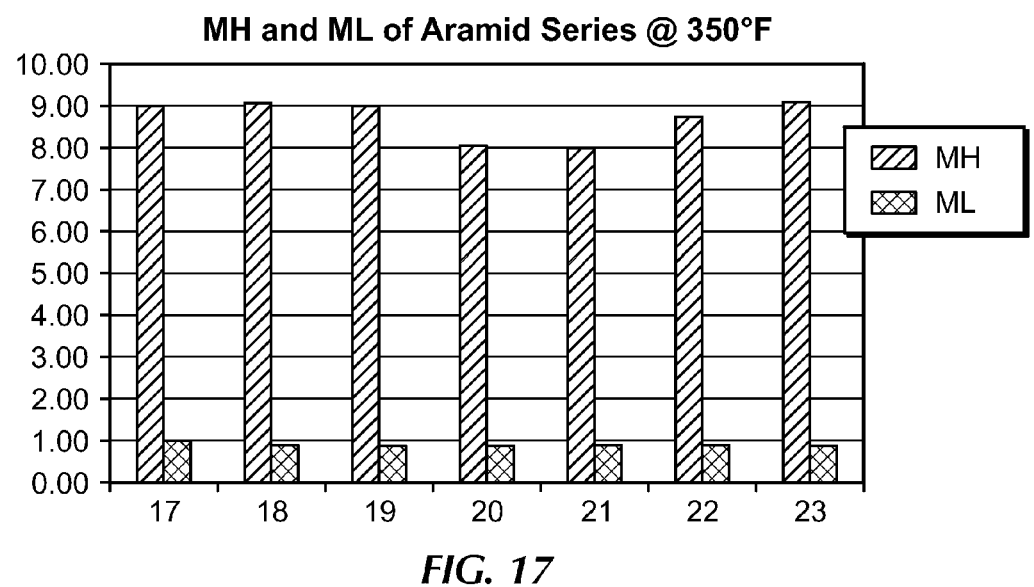
FIG. 17 is a graph of MH and ML for Aramid series at 350° F. in accordance with embodiments disclosed herein.

As shown in FIG. 15, the viscosity decreases with the increase of fiber load. The effect of fiber on cure characteristics is insignificant, e.g., as shown in FIGS. 16 and 17, the dependence of the cure rate (Tc90), scorch (Ts2), or maximum and minimum torques (MH and ML) on the fiber concentration is slight and random. In order to adjust hardness, carbon black was reduced and then plasticizer was added with the increase fiber load as shown in Table 8, which may contribute to the compensation of maximum torque and the decrease of viscosity.

Physical properties are shown in Table 12.

TABLE 12

Physical properties of Aramid Series

| Example | 17 | 18 | 19 | 20 | 21 | 22 | 23 | 24 |
|---|---|---|---|---|---|---|---|---|
| Aramid Fiber (phr) | 0.00 | 1.25 | 2.5 | 3.75 | 5.00 | 7.50 | 10.00 | 5.00 |
| Hardness (Shore A) | 67 | 69 | 70 | 70 | 69 | 74 | 75 | 70 |
| Properties with Grain | | | | | | | | |
| Tensile strength (psi) | 2736 | 2736 | 2644 | 2245 | 2041 | 1579 | 1558 | 1923 |
| Elongation (%) | 669 | 661 | 656 | 692 | 662 | 555 | 89 | 626 |

TABLE 12-continued

Physical properties of Aramid Series

| Example | 17 | 18 | 19 | 20 | 21 | 22 | 23 | 24 |
|---|---|---|---|---|---|---|---|---|
| Modulus 100% (psi) | 217 | 396 | 625 | 754 | 950 | 1289 | 1555 | 992 |
| Modulus 200% (psi) | 461 | 649 | 795 | 892 | 1048 | 1275 | 1112 | 1057 |
| Modulus 300% (psi) | 853 | 966 | 999 | 993 | 1102 | 1281 | N/A | 1107 |
| Modulus 400% (psi) | 1314 | 1385 | 1332 | 1176 | 1227 | 1348 | N/A | 1237 |
| Tear strength (lbs/in) | 275 | 318 | 330 | 350 | 317 | 353 | 340 | 350 |
| Properties with Grain | | | | | | | | |
| Tensile strength (psi) | 2788 | 2756 | 2438 | 2325 | 2003 | 1695 | 1442 | 1988 |
| Elongation (%) | 692 | 686 | 665 | 702 | 684 | 632 | 532 | 662 |
| Modulus 100% (psi) | 208 | 286 | 307 | 349 | 418 | 453 | 505 | 411 |
| Modulus 200% (psi) | 456 | 546 | 567 | 597 | 656 | 727 | 799 | 638 |
| Modulus 300% (psi) | 851 | 891 | 869 | 835 | 860 | 921 | 996 | 848 |
| Modulus 400% (psi) | 1301 | 1304 | 1223 | 1103 | 1078 | 1109 | 1180 | 1082 |
| Tear strength (lbs/in) | 275 | 311 | 397 | 398 | 406 | 421 | 398 | 380 |
| Compression Set (70 hrs @ °212 F.) | 51 | 50 | 52 | 55 | 56 | 57 | 50 | 57 |

Figure 18:
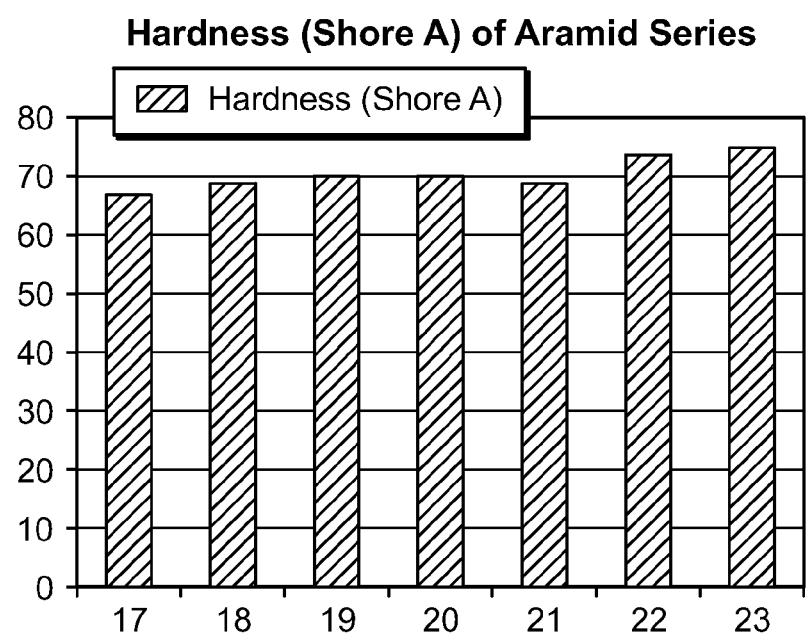
FIG. 18 is a graph of Hardness (Shore A) for Aramid series in accordance with embodiments disclosed herein.

FIG. 18 shows the hardness changing with the addition of aramid fiber. Although carbon black is reduced and plasticizer is added, the fiber reinforced compounds have slightly higher hardness (2 to 3 Shore A points) than the control compound when the fiber concentration is not over 5 phr. The hardness increase becomes significant when fiber load is over 7.5 phr.

Figure 19:
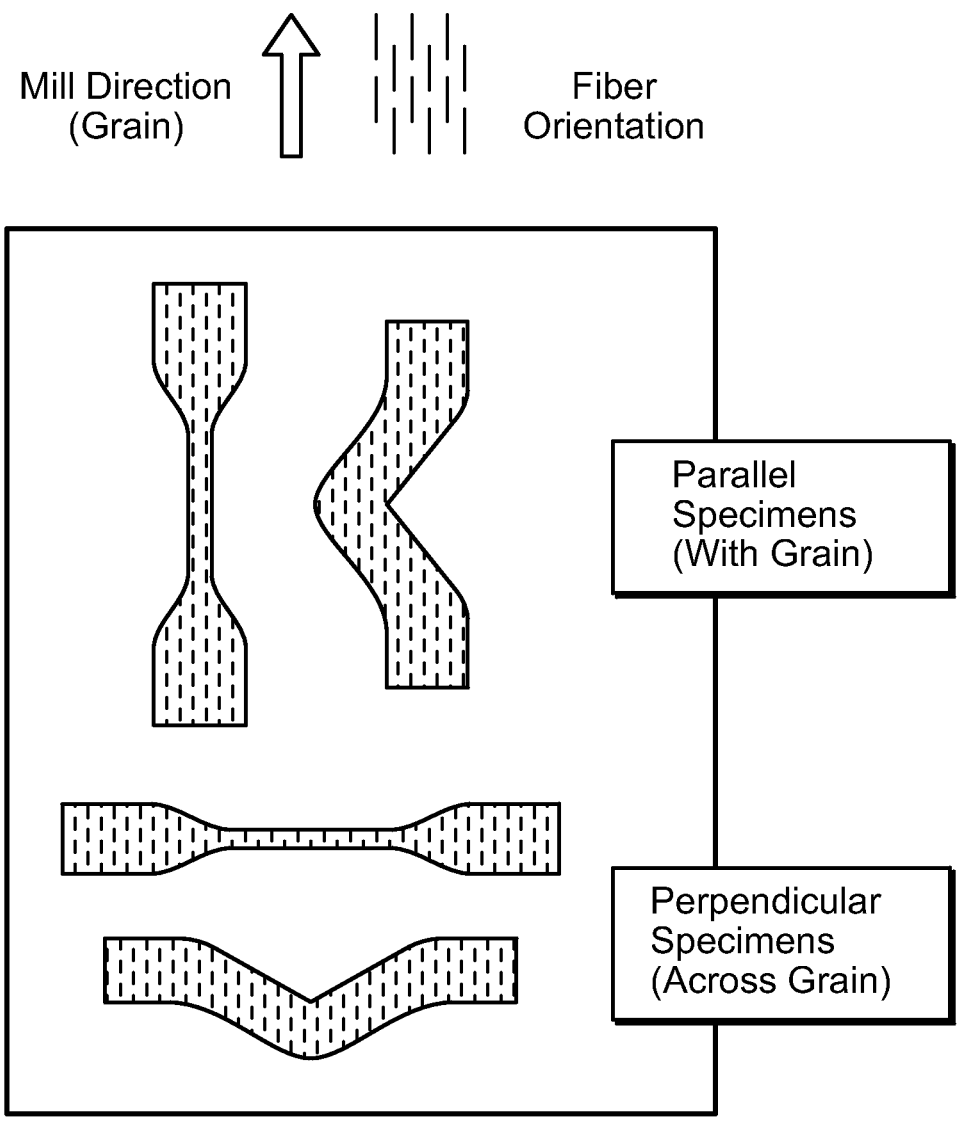
FIG. 19 is a sketch of specimens cut with and against mill direction for Aramid series in accordance with embodiments disclosed herein.
Figure 20:
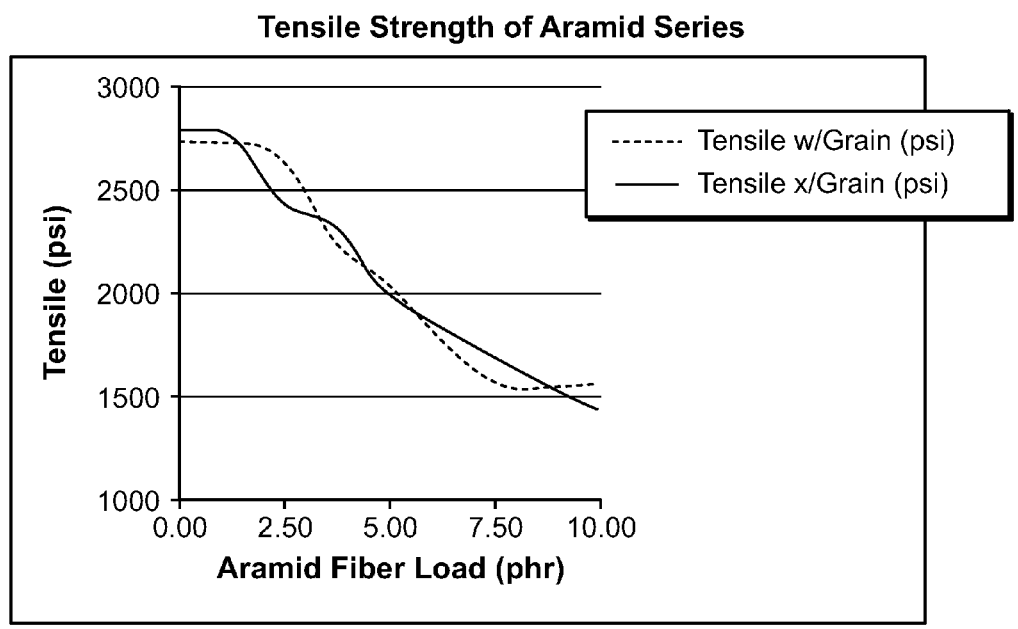
FIG. 20 is a graph of tensile strength for Aramid series in accordance with embodiments disclosed herein.

The tensile strength and tear strength tests were conducted on the specimens cut from the ASTM slabs by both directions of with and across the grain (see FIG. 19). As shown in FIG. 20, tensile strength decreases with the increase of fiber load except for low fiber concentration, e.g. not exceed 2.50 phr. These trends are very similar between the two directions of with and across the grain.

Figure 21:
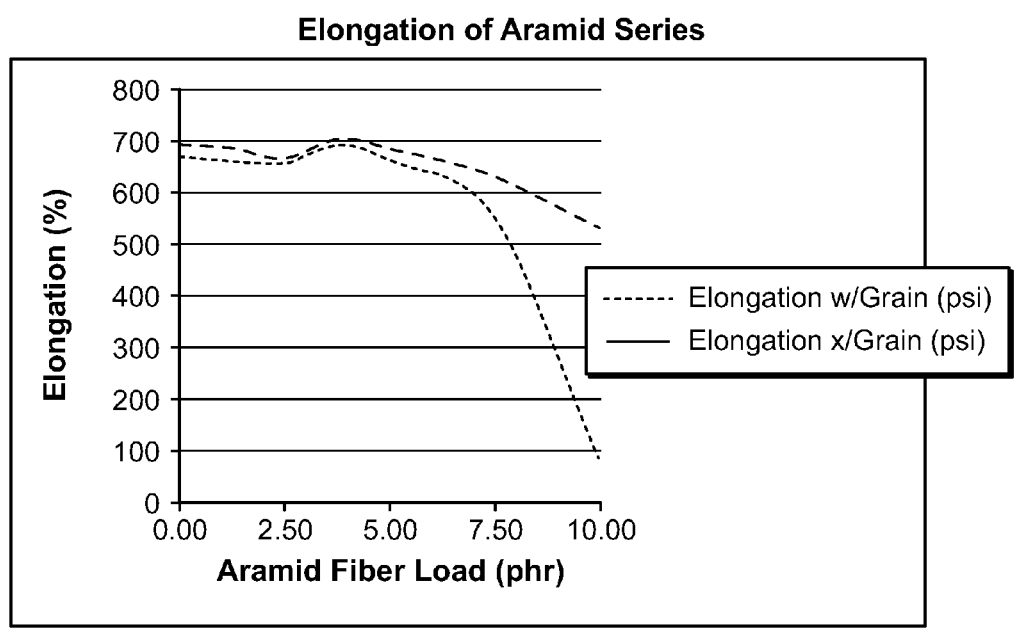
FIG. 21 is a graph of Elongation for Aramid series in accordance with embodiments disclosed herein.

As shown in FIG. 21, in both directions of with and across the grain, the change of elongation is not significant at low fiber concentrations, however, at high fiber load of 10 phr, the elongation with grain falls down to as low as 89%.

Figure 22:
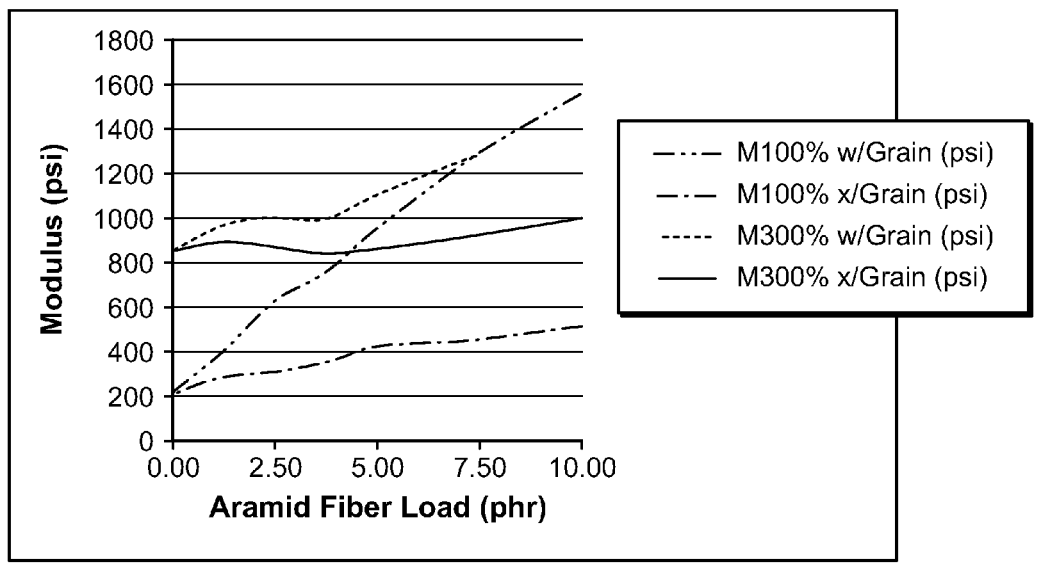
FIG. 22 is a graph of Modulus M100 and M300 for Aramid series in accordance with embodiments disclosed herein.

As shown in FIG. 22, with the increase of fiber load, modulus M100 with grain increases, while that across grain also increases though not as much as that with grain. The anisotropy in stiffness introduced by aramid fiber is significant. Similar trends are seen for the modulus M300 though at a lower level.

Here for ease of analysis, two parameters are defined as follows:
a) Factor of modulus M100 enhancement FE(M100):

$FE(M100-w)=M100(\text{with grain})/M100(\text{Control});$ $FE(M100-x)=M100(\text{across grain})/M100(\text{Control});$ b) Index of stiffness M100 anisotropy IA(M100)

$IA(M100)=M100(\text{with grain})/M100(\text{across grain})$

Figure 23:
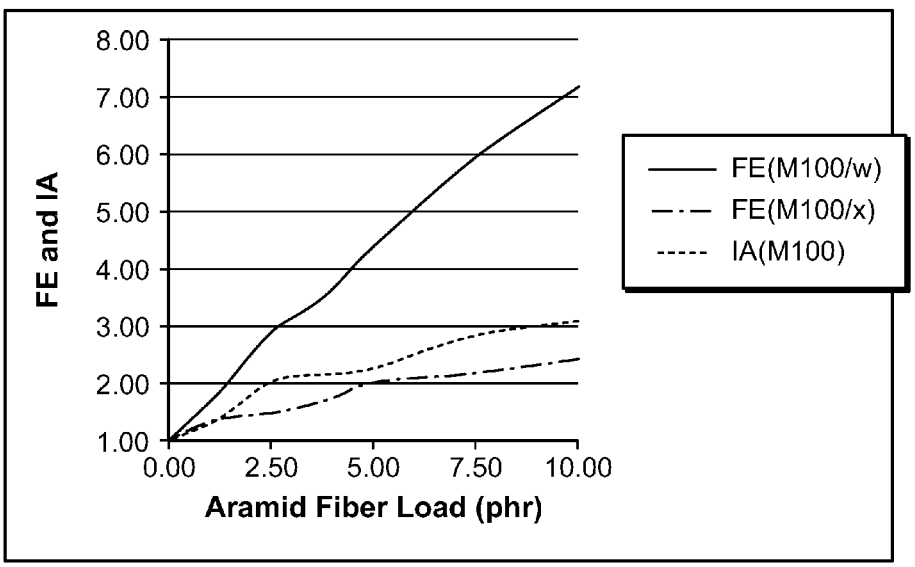
FIG. 23 is a graph of Factor of Modulus Enhancement and Index of stiffness Anisotropy for Aramid series in accordance with embodiments disclosed herein.

The calculated results for these parameters are listed in Table 13 and plotted in FIG. 23. By definition, the FE(M100) for the control compound (Example 17) is 1.00. The IA(M100) for the control compound (Example 17) is 1.04.

The slight anisotropy of Example 17 is attributed to its "regular grain", that is, the orientation of polymer chain and carbon black structures.

TABLE 13

Factor of Modulus Enhancement (FE) and Index of Stiffness Anisotropy (IA) of Aramid series

| Example | 17 | 18 | 19 | 20 | 21 | 22 | 23 |
|---|---|---|---|---|---|---|---|
| Fiber (phr) | 0.00 | 1.25 | 2.50 | 3.75 | 5.00 | 7.50 | 10.00 |
| FE (M100/w) | 1.00 | 1.82 | 2.88 | 3.47 | 4.38 | 5.94 | 7.17 |
| FE (M100/x) | 1.00 | 1.38 | 1.48 | 1.68 | 2.01 | 2.18 | 2.43 |
| IA (M100) | 1.04 | 1.38 | 2.04 | 2.16 | 2.27 | 2.85 | 3.08 |

In Example 19, with 2.5 phr of aramid fiber, the factor of M100 enhancement with the grain is 2.88, and the index of stiffness anisotropy is 2.04. In other words, the modulus M100 with grain is almost 200% higher than the control compound and is 100% higher than it's across grain counterpart.

Figure 24:
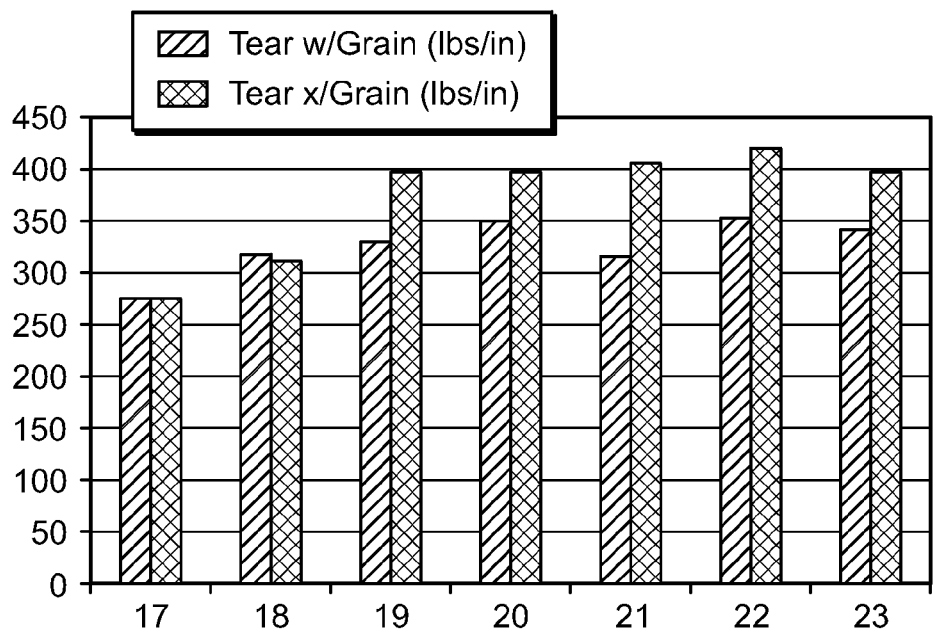
FIG. 24 is a graph of tear strength for Aramid series in accordance with embodiments disclosed herein.

The tear strength increases with addition of aramid fiber as shown in FIG. 24. Especially, when fiber load is 2.5 phr or over, the tear strength across grain increases to about 400 lbs/in, that is, 45% higher than the control.

Figure 25:
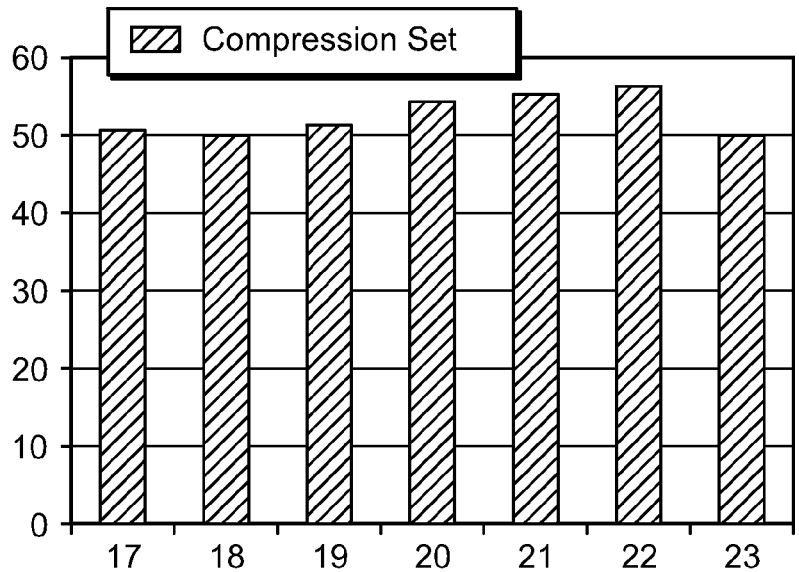
FIG. 25 is a graph of Compression Set for Aramid series in accordance with embodiments disclosed herein.

FIG. 25 shows the compression set of the lab series. With low fiber load (2.5 phr or under), the compression set is not affected by aramid fiber. When fiber load is 3.75 phr or over, compression set increases slightly, except for Example 17. Generally speaking, the effect of aramid fiber on compression set is not significant.

Figure 26A:
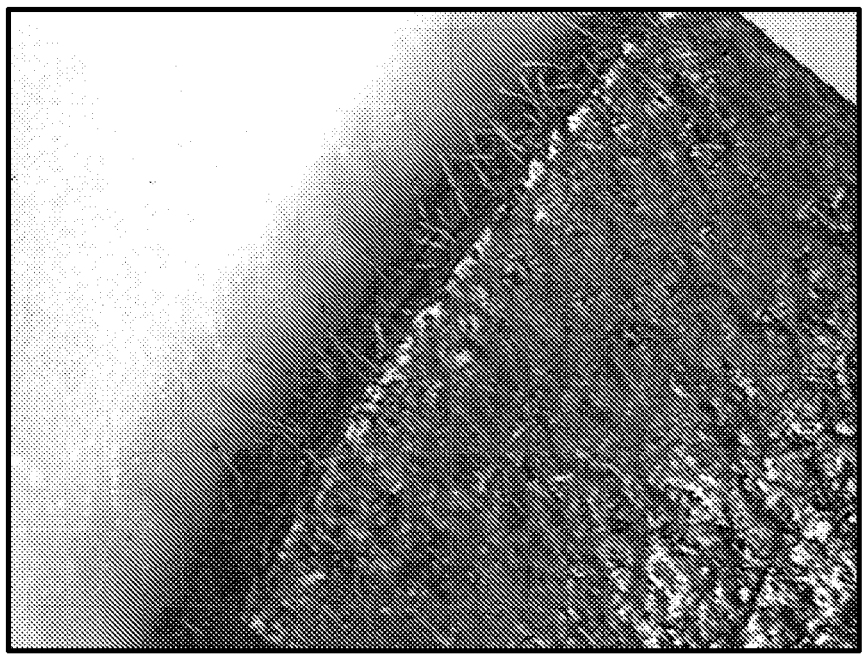
FIGS. 26A and 26B are perspective views of tensile broken surface with and across grain specimen, respectively in accordance with embodiments disclosed herein.
Figure 26B:
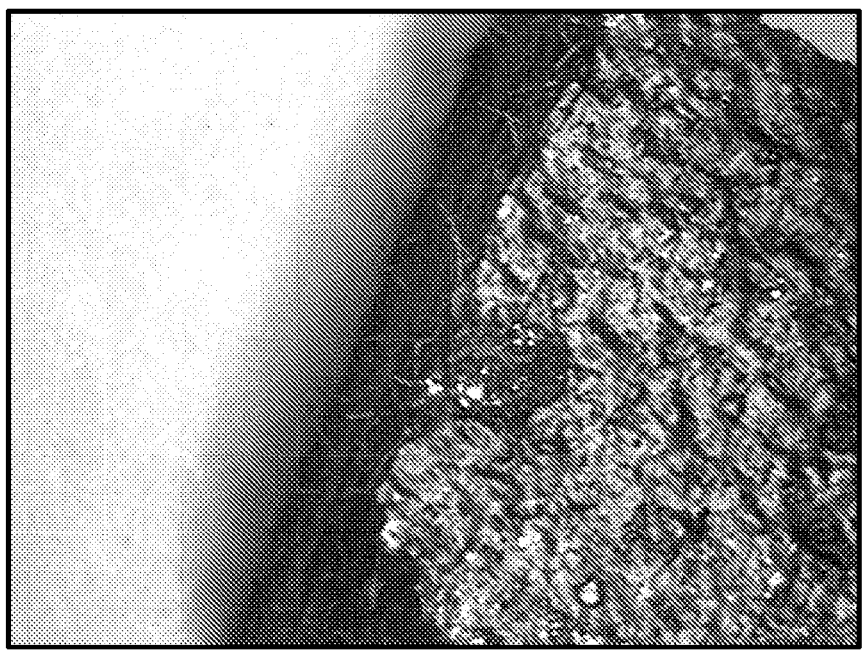

The fiber dispersion and orientation were determined via observing the cross-section surfaces parallel or perpendicular to the grain direction using Caltex 3D digital video microscope system. The broken surfaces of the tensile specimens were observed under optical microscope. The surface of the parallel specimen has much more pull-out fiber heads than the surface of its perpendicular counterpart with the same fiber load. In addition, while the distribution of these pull-out fiber heads on the broken surface of the parallel specimen is even, those of the perpendicular specimen are distributed randomly. The examples of Example 21 are shown in FIGS. 26A and 26B. These phenomena evidence the orientation of the aramid fibers in the ASTM slabs, which is consistent with the modulus enhancement and stiffness anisotropy of the fiber enhanced elastomer.

Figure 27A:
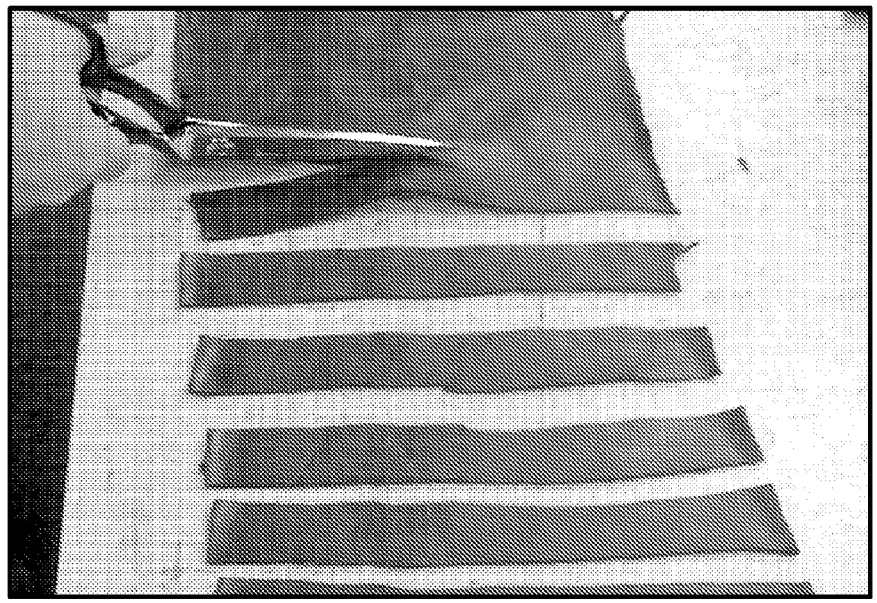
FIGS. 27A-E are perspective views of the process for molding a 2" sample anisotropic annular packer in accordance with embodiments disclosed herein.
Figure 27B:
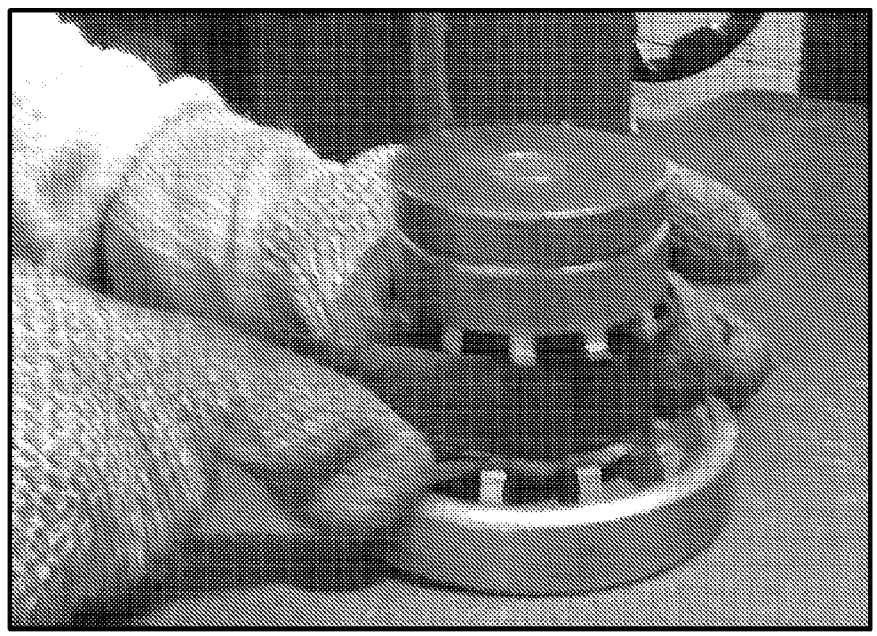
Figure 27C:
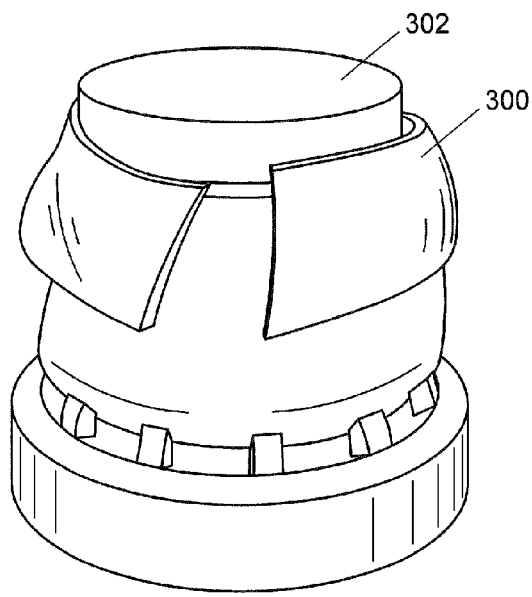
Figure 27D:
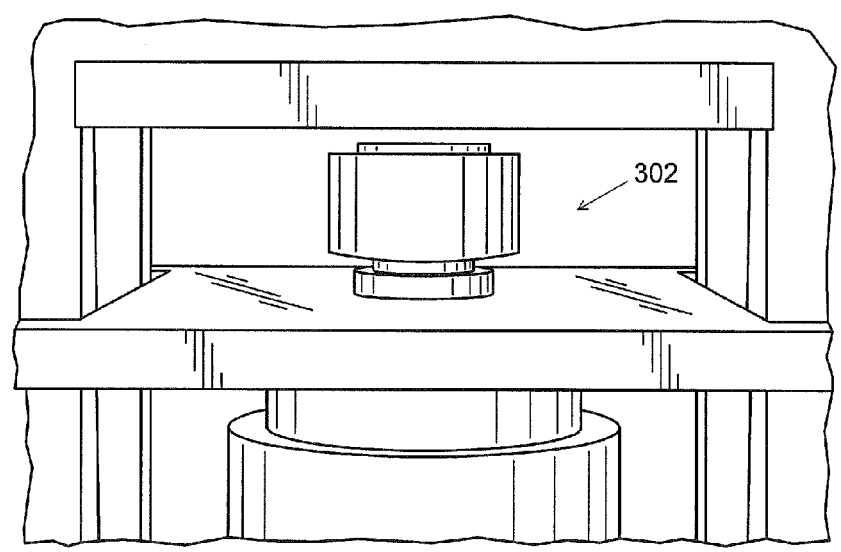
Figure 27E:
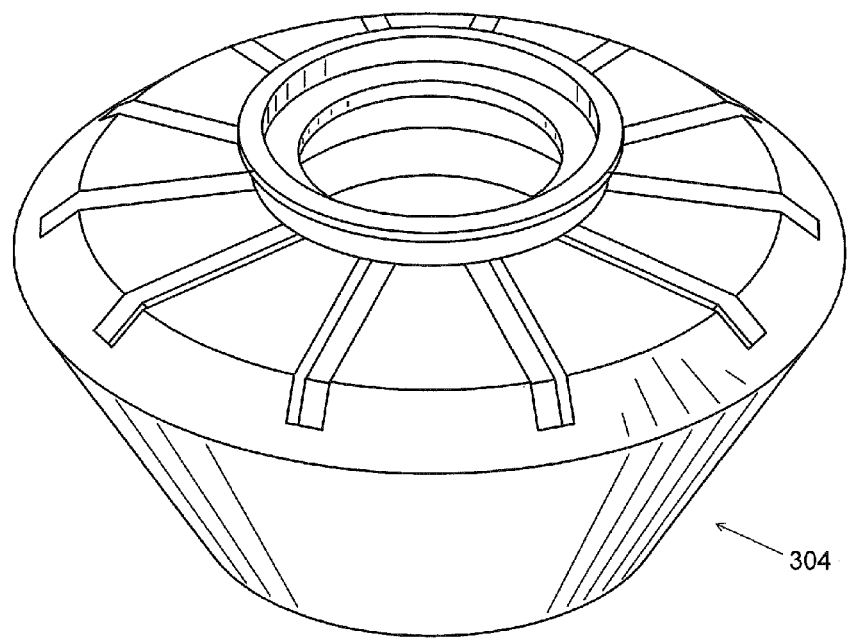

To observe the orientation of the fiber in an annular packer molded to provide fibers aligned parallel to the axis, a sample anisotropic annular was made. Example 21, a mixed fiber reinforced compound, was milled in lab mill and sheeted off in about 2 mm thickness. Prep straps were cut 90 degree across the mill direction (FIG. 27A. The prep straps 300 were wrapped around the mold core 302 in the way that the mill direction is parallel with the annular axis (FIGS. 27B and 27C). When the mold was closed, the up-half of the mold pushed the compound to flow downwards (FIG. 27D). The size of the sample annular 304 is shown in FIG. 27E. The cure condition was 45 minutes at 300° F.

Figure 28A:
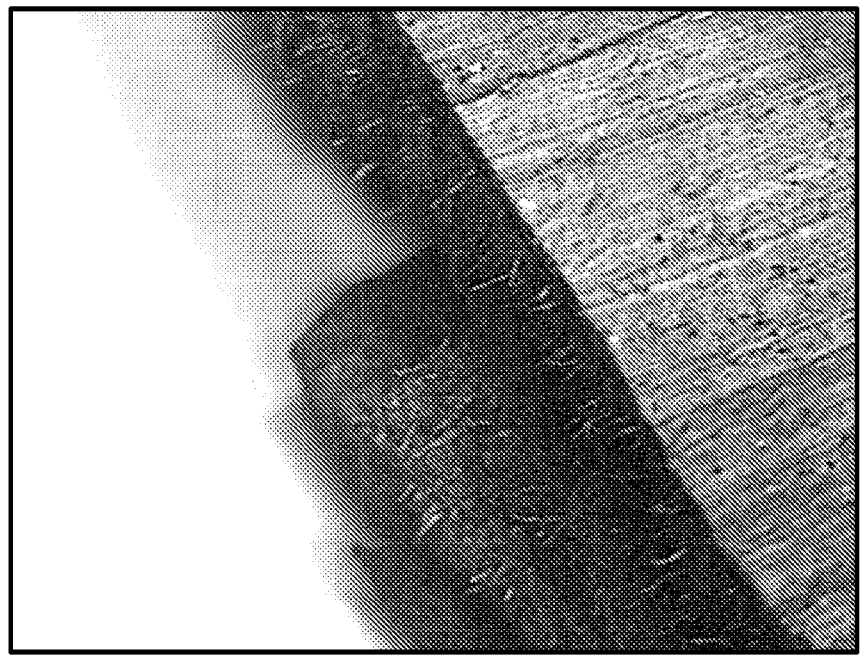
FIGS. 28A and 28B are perspective views of tensile broken surface with and across grain specimen, respectively for the sample anisotropic annular packer of FIGS. 27A-E in accordance with embodiments disclosed herein.
Figure 28B:
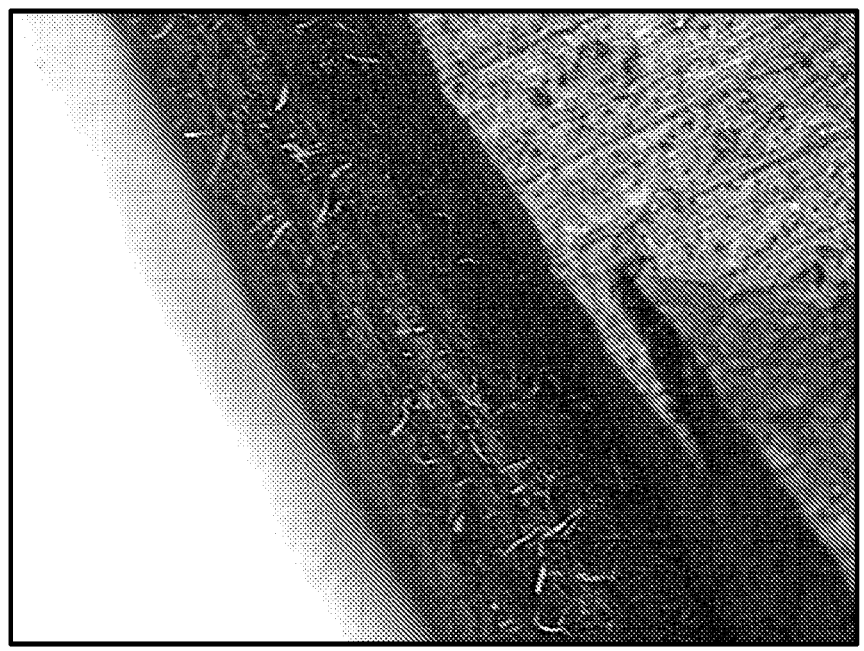

Small rubber sticks were slit and pulled from the 2" sample packer such that the cross-section surfaces are either parallel or perpendicular to the packer axis. The packer was molded from Example 21. As shown in FIG. 15, the surface perpendicular to packer axis (FIG. 28A) is similar to the "with grain" specimen from the ASTM slab (FIG. 26A), while the surface parallel to packer axis (FIG. 28B) is similar to the "across grain" specimen (FIG. 26B). In other words, the aramid fibers in the 2" sample packer are oriented with the packer axis. This is attributed to the way the compound was loaded into the mold, that is, mill grain is parallel to the axis and rubber flows downwards when the mold was closed, as shown in FIGS. 27A-E.

Figure 29:
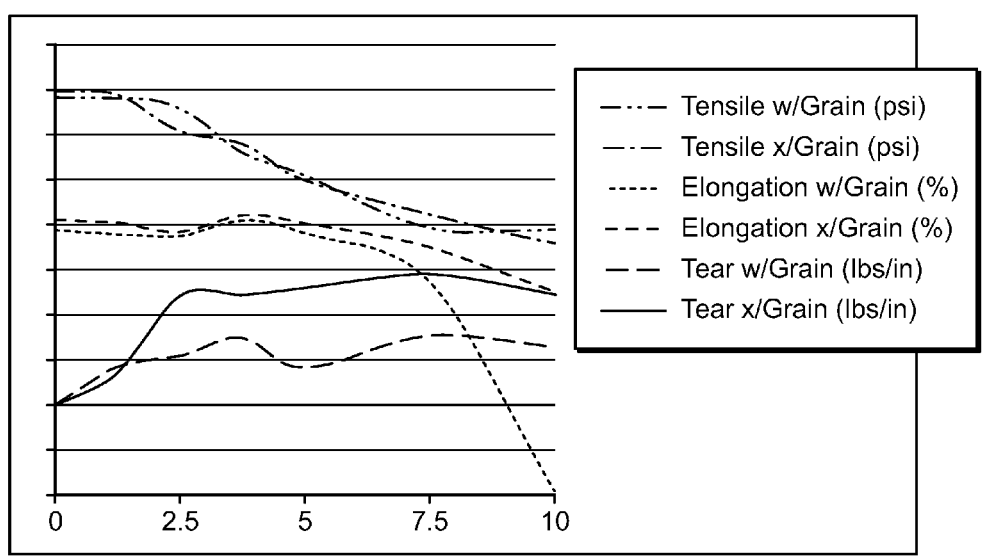
FIG. 29 is a graph of tensile strength, elongation, and tear strength vs. aramid fiber load in accordance with embodiments disclosed herein.

When the aramid fiber load was increased to 2.5 phr or over, tear strength increased significantly; however, tensile strength decreased as fiber exceeding 2.5 phr and elongation decreased at high fiber concentrations, as shown in FIG. 29. Therefore, 2.5 phr was tested for the optimum fiber load in terms of the balance among tear strength, tensile strength and elongation. At this fiber concentration, the modulus with grain is tremendously enhanced from the control compound B, yet the modulus across grain is much lower than the stiff compounds such as compound C and compound D, which have trouble closing when produced as a GX11-5 annular. Therefore, Example 19 was selected as the pilot compound for molded annular BOP trial.

Pilot compound formulations and mixing procedure are shown in Tables 14 and 15, respectively. The mixing was conducted in a 220 liter Banbury mixer. The master batch of the pilot compound included NIPOL DN 1201 elastomer available from Zeon Chemicals L.P. (Louisville, Ky.), RHENOGRAN P95-50/NBR aramid fibers available from Rhein Chemie (Mannheim, Germany), N326 CARBON BLACK available from Continental Carbon (Houston, Tex.), N660 CARBON BLACK available from Continental Carbon (Houston, Tex.), HI SIL™ 243-LD amorphous silica available from PPG Industries Inc. (Monroeville, Pa.), TMQ stearically hindered amine available from Western Reserve Chemical (Stow, Ohio), SANTOFLEX 13 antioxidant available from Flexsys America L.P. (Akron, Ohio), SP25 TACKIFIER RESIN available from SI Group Inc. (Schenectady, N.Y.), STEARIC ACID available from Hallstar (Chicago, Ill.), DIDP EZ MIX available from Hallstar (Chicago, Ill.), ZnO911C-85/NBR/S available from Akrochem (Akron, Ohio), WB222 PROCESS AID available from Struktol (Stow, Ohio). To this master batch the following were added: MC-98 Sulfur available from Akrochem (Akron, Ohio), MBTS-75 available from Akrochem (Akron, Ohio), and PB (TETD) 75 available from Rhein Chemie (Mannheim, Germany)

TABLE 14

Formulation of pilot compound

| Description | phr |
|---|---|
| First pass | |
| NIPOL DN 1201 | 100 |
| RHENOGRAN P95-50/NBR | 5 |
| N326 CARBON BLACK | 12 |
| N660 CARBON BLACK | 28 |
| HI SIL 243-LD | 15 |
| TMQ | 3 |
| SANTOFLEX 13 | 1 |
| SP25 TACKIFIER RESIN | 5 |
| STEARIC ACID | 0.5 |
| DIDP EZ MIX | 13.2 |

TABLE 14-continued

Formulation of pilot compound

| Description | phr |
|---|---|
| ZnO911C-85/NBR/S | 5 |
| WB222 PROCESS AID | 1.5 |
| Pilot master batch total: | 189.2 |
| Final pass | |
| Pilot master batch | 189.2 |
| MBTS-75 | 2 |
| PB (TETD) 75 | 0.2 |
| MC-98 Sulfur | 2 |
| TOTAL | 193.4 |

TABLE 15

Pilot Compound Mixing Procedure

| Minute | Temp | Ingredients |
|---|---|---|
| First Pass | | |
| 0 | | 20 RPM, Rubber, fiber |
| 2 | | Chemicals and Hisil |
| 3.3 | | Sweep and Balance |
| | 230° F. | Sweep |
| | 240° F. | Dump |
| Final Pass | | |
| 0 | | 20 RPM, ½ MB, Cure, ½ MB |
| | 190° F. | Dump |

The pilot batches of aramid fiber reinforced compound were mixed in the production size (220 liters) Banbury mixer. No extra mixing time or energy is required to distribute or disperse the fibers into the composite. The molding equipment used such as prep mill, mold and press are the same as those for a standard GX11-5 packer. However, caution must be taken to follow the strategies as described below to ensure the grain is parallel to the packer axis.

Figure 30:
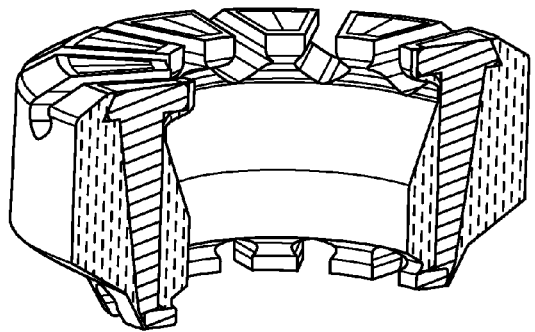
FIG. 30 is a sketch of a fiber reinforced anisotropic annular packing unit in accordance with embodiments disclosed herein.
Figure 30:
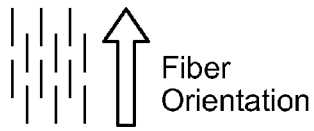
Figure 30:
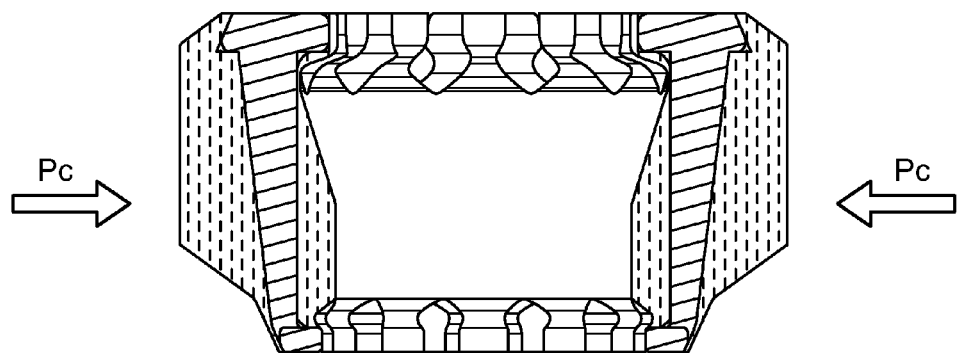
Figure 30:
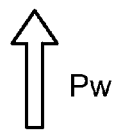

The annular packer is designed to take advantage of the stiffness anisotropy of the fiber reinforced compound. The fiber orientation is parallel to the annular axis so that the packer is vertically stiff to resist the wellbore pressure yet horizontally flexible for easy closing, as shown in FIG. 30. The processing strategies are as follows:
 a) Mill the compound to enhance fiber orientation;
 b) Load the mold in the way that the mill grains of the preps are parallel to the packer axis;
 c) Load and close the mold in the way that the compound dominantly flows vertically so that the directionality of the reinforcing fibers is further developed.

Figure 31A:
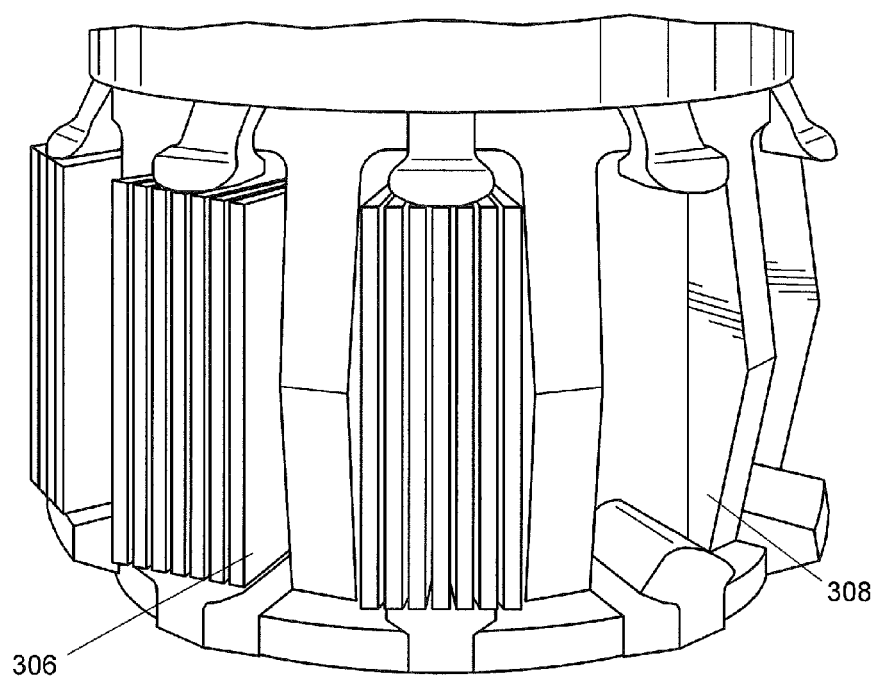
FIG. 31A-C are perspective views of molding an anisotropic annular packer in accordance with embodiments disclosed herein.
Figure 31B:
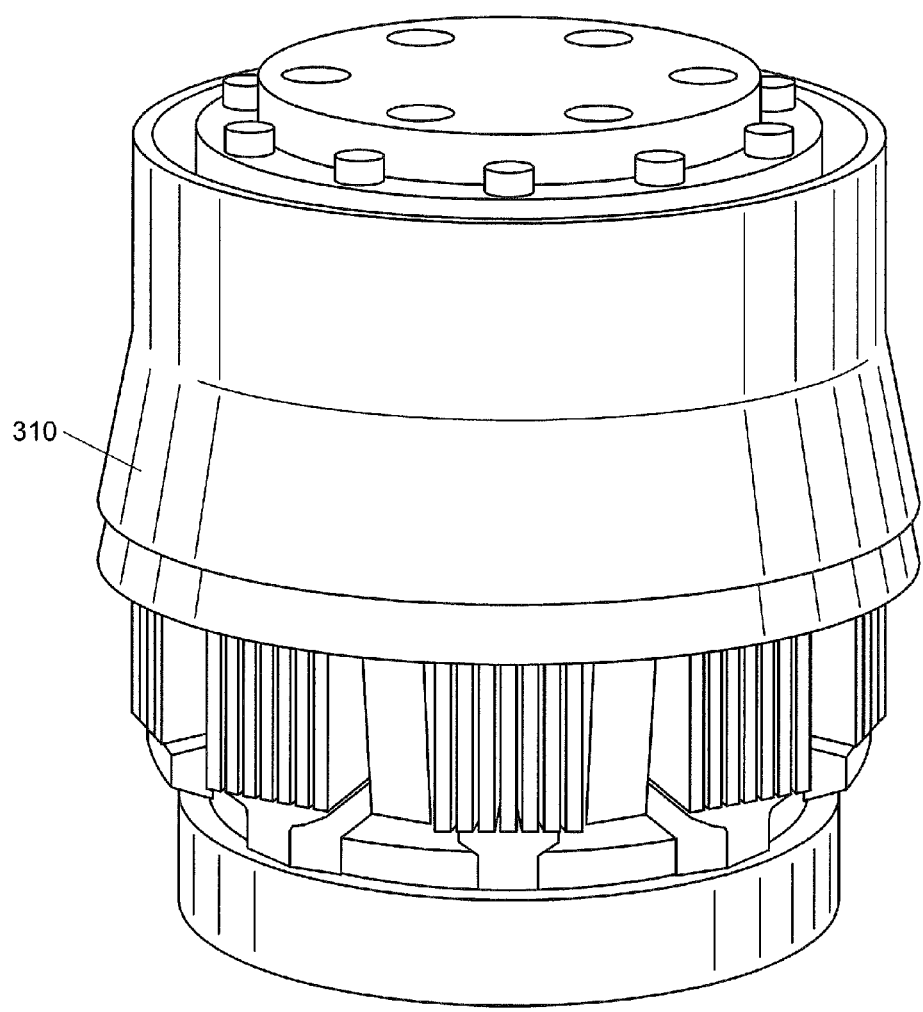
Figure 31C:
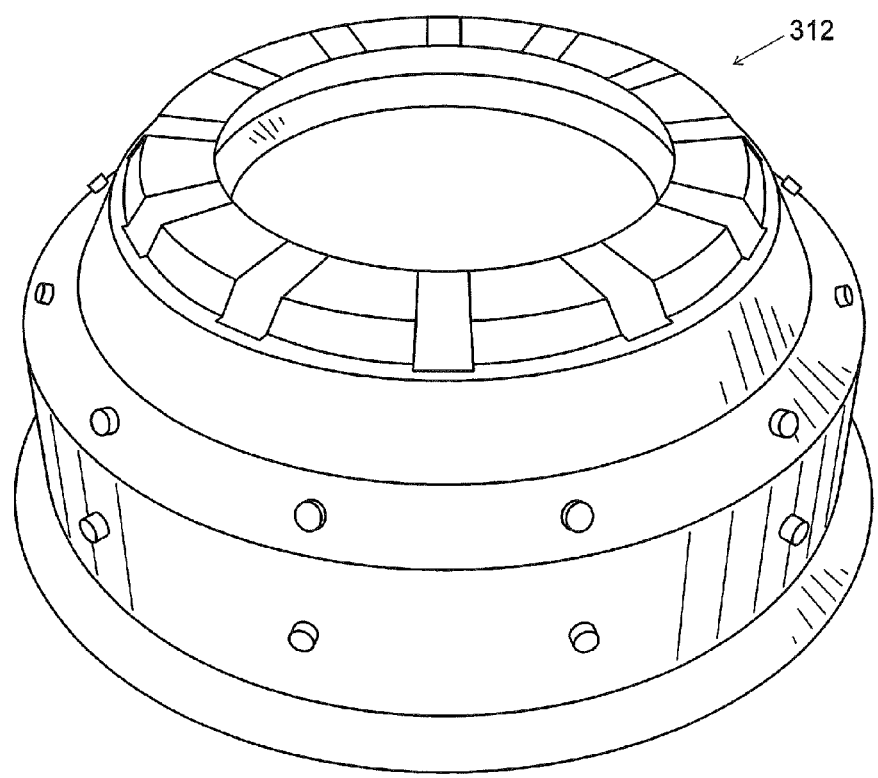

The pilot batches of pilot batch compound were milled in a 22" OD×59" two-roll mill about 3 minutes. The prep strap-A 306 was sheeted off longitudinally parallel to the mill direction. Multi-layers of prep strap-A 306 were cut and loaded into the mold between metal inserts 308 in the way that the mill direction is parallel to the packer axis (FIG. 31A). The prep strap-B 310 was cut from the mill perpendicular to the mill direction, and wrapped onto the mold longitudinally perpendicular to the mold axis so that the grain is parallel to the packer axis (FIG. 31B). When the mold was closed, the up-half of the mold pushed the compound flow downwards. The de-molded packer 312 is shown in FIG. 31C. The cure condition was 2 hours at 250° F., and then 2.5 hours at 275° F., followed by 9 hours at 295° F.

Sealing characteristic tests of the BOP followed API Specification 16A, 5.7.3.1.
 a) The BOP was closed with 1000 psi Pc (closing pressure), and the pattern regularities were recorded.
 b) 5" OD test pipe was installed into the BOP. The BOP was closed until 250 psi Pw can be sealed. Pc was reduced until slight leakage occurred. Pc was increased until resealed. The Pc for the second seal was recorded.
 c) Pw (working pressure) was increased to 5000 psi, and Pc was recorded. BOP was opened and the test pipe was removed.
 d) The BOP was closed until 250 psi Pw can be sealed. Pc was reduced until slight leakage occurred. The Pc was then increased until resealed. Pc was recorded for the second seal.
 e) The number of flexing cycles required before the packer held 250 psi Pw was recorded.
 f) Pw was increased to 2500 psi. The Pc was reduced until slight leakage occurred. Pc was increased until resealed. The Pc was recorded for the second seal.

The fatigue test followed API Specification 16A, 5.7.3.2.
 a) The test mandrel diameter was 5 inches.
 b) The BOP was closed and opened six times with close pressure of 1000 psi, holding wellbore pressure of 250 psi for 3 minutes.
 c) The BOP was closed a seventh time with Pc of 1000 psi and Pw of 5000 psi, hold time was 3 minutes; relax time was 5 minutes.
 d) The steps b and c were repeated until packer leaks, and the pressure cycles (every 7 function cycles) were recorded.

The physical properties of the pilot master batch and the sealing characteristics of anisotropic GX11-5 annular are listed in Table 16 and 16A with comparisons to the GX11-5 packers molded from several stiff compounds as well as the standard compound B.

TABLE 16

Elastomer compound physical properties

| Compound Code | Compound Batch # | M100 psi | M300 psi | Tensile Strength Psi | Elongation Hard % | Tear Strength Lbs/in | Hardness Shore A |
|---|---|---|---|---|---|---|---|
| Compound C | 7011-2 | 498 | 2031 | 3132 | 574 | 362 | 81 |
| Compound D-A | 7305-2 | 414 | 1650 | 3306 | 623 | 344 | 80 |
| Compound D | 7219-3 | 350 | 1334 | 3254 | 662 | 368 | 76 |
| Compound D | 7419-11 | 310 | 1167 | 3147 | 703 | 367 | 76 |
| Compound B | 3887-10 | 231 | 833 | 2775 | 715 | 295 | 70 |
| Pilot compound | 7501-3-w | 645 | 1217 | 2739 | 645 | 340 | 70 |
| | 7501-3-x | 344 | 1035 | 2390 | 623 | 394 | 70 |

TABLE 16A

Elastomer annular seal characteristics
Letters are reference to testing procedure described above

| GX11-5K Serial # | a | b | c | d | e | f |
|---|---|---|---|---|---|---|
| | Pattern of BOP w/ 1000 psi Pw | Pc (psi) 5" pipe w/ 250 psi Pw | Pc (psi) 5" pipe w/ 5000 psi Pw | Pc (psi) CSO w/ 250 psi Pw | Cycles to close | Pc (psi) CSO w/ 2500 psi Pw |
| 0211-0507 | Good | 3000 not close | Not close | 3000 not close | Not close | Not close |
| 0611-1338 | Good | 800 | 500 | 3000 not close | Not close | Not close |
| 0611-1327 | Good | 1000 | 800 | 2300 | 16 | 3000 |
| 0711-1774 | Good | 1000 | 500 | 2500 | 16 | 2100 |
| 0108-0003 | Good | 800 | 300 | 1900 | 6 | 1900 |
| 0811-1868 | Good | 1000 | 300 | 2000 | 8 | 2200 |

Compound C has the highest modulus and the GX11-5 annular molded from it cannot close on 5" pipe. Compound D-A has the second high modulus and its GX11-5 annular can close on 5" pipe but cannot close CSO (complete shut off) even with extreme high Pc (3000 psi). Compound B has the lowest modulus and it can close either on 5" pipe or CSO with the lowest closing pressure. Two batches of Compound D have the modulus between the stiffer compounds of Compound C/Compound D-A and the standard compound B, their GX11-5 packers require much higher closing pressure to close 5" pipe or CSO, and they require much more flexing cycles, i.e. 16 vs. 6, to achieve full closure, as compared with the standard GX11-5. However, the packers of these stiff compound C or Compound D-A have longer fatigue life. The tested packers molded from Compound C/Compound D-A have 300 to 500 plus fatigue cycles, while the standard one of Compound B has 150 fatigue cycles.

For the fiber reinforced pilot compound, the M100 with grain is the highest among the tested compounds, and the M300 with grain is comparable to Compound D, while its M100 across grain is similar to Compound D, and M300 across grain is lower than Compound D but higher than Compound B. Comparing the sealing characteristics of fiber reinforced GX11-5 with the others, the closing pressure on 5" pipe with 250 psi wellbore pressure is same as the ones of Compound D. At the testing step-b on the 5" pipe with 5000 psi wellbore pressure, the packer of pilot compound requires Pc of 300, which is the same as standard one of Compound B and lower than all the other listed ones. To close CSO with 250 psi, the Pw, the Pc and the flexing cycles of the anisotropic packer of the pilot compound are slightly higher than the standard one of Compound B, yet much lower than the other listed packers. At the testing step-d, only the packers of pilot compound and Compound B passed the specific maximum Pc of 2000 psi. However, the Pc of CSO with Pw of 2500 psi for the packer of pilot compound failed the specific maximum Pc of 2000 psi, same as the other listed packers except for the standard one.

Figure 32:
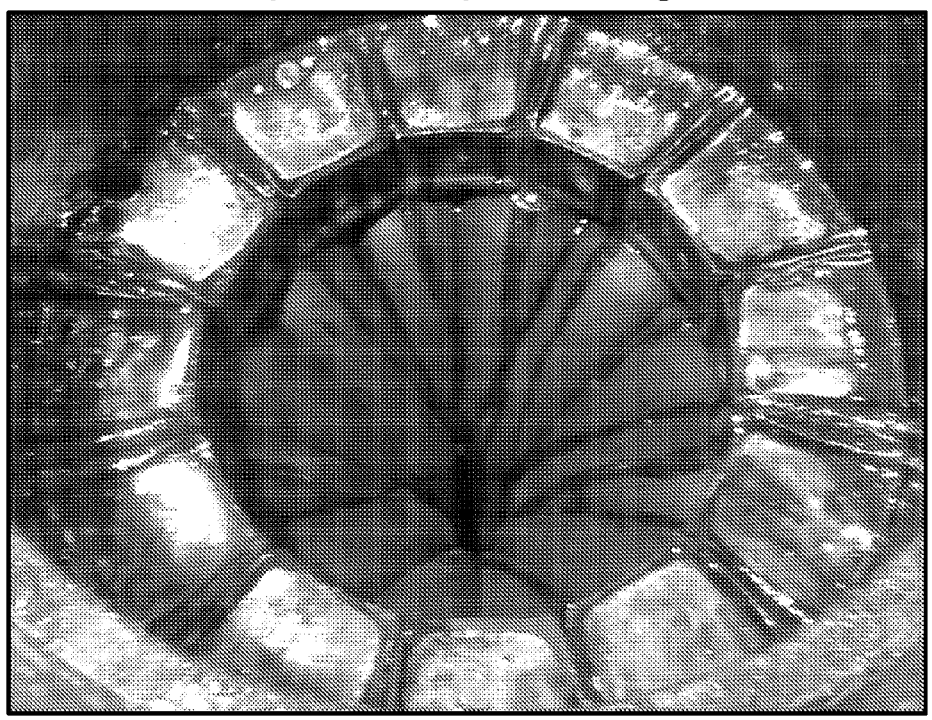
FIG. 32 is a perspective views of the anisotropic annular packer at step-a of sealing test in accordance with embodiments disclosed herein.

The pattern regularity of the pilot compound packer at testing step-a is good, as shown in FIG. 32. The fatigue life for the anisotropic packer of pilot compound is 206 cycles, which is 37% higher than the standard packer of Compound B, though it is much lower than these stiff packers.

It is noteworthy that the carbon black systems are similar among Compound C and Compound D-A, but different from Compound B. The black systems in Compound C and Compound D-A have higher reinforcing structures and higher loads than that in Compound B, which contribute to their higher stiffness/modulus and higher hardness. Consequently, they provide high fatigue life but sacrifice good sealing characteristics. The pilot compound is formulated based on Compound B with addition of 2.5 phr of aramid fiber and reduction of 7 phr N660 carbon black. The low load short fiber gives enhanced modulus and stiffness anisotropy, higher tear strength, yet same hardness, providing longer fatigue life and comparable sealing characteristics as well.

The pilot compound, the nitrile annular compound with 2.5 hpr of pre-treated pulp aramid fiber, exhibits enhanced modulus and anisotropic stiffness. It has comparable tensile strength, elongation, hardness and compressions set, yet higher tear strength, compared to the control compound of Compound B.

Desired fiber orientation can be achieved in an annular packer via properly milling and cutting the elastomer preps, loading and closing the mold in a way that the grain of the preps is parallel to packer axis and that the elastomer dominantly flows vertically.

The anisotropic GX11-5 packer properly molded from the pilot compound has 37% higher fatigue cycles yet comparable sealing characteristics, compared to the control packer of Compound B.

Embodiments disclosed herein may also be designed to replace existing packing units in existing annular BOPs. For example, a BOP may have the removable head or removable housing detached. A packing unit in accordance with embodiments disclosed herein may then be installed to replace an existing packing unit disposed within the BOP. Although such an embodiment may require modification to the BOP, significant savings may be achieved by reusing components. In some embodiments, the present invention may also replace prior art packing units without modification to the BOP.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A packer unit for an annular blowout preventer, the packer unit comprising:
   an annular elastomer body comprising an elastomer having a unidirectional grain that is arranged in a direction parallel with an axis of the blowout preventer;
   a bore extending through the annular elastomer body and defining a longitudinal axis; and
   a quantity of fibers longitudinally aligned with both the grain of the elastomer and with the longitudinal axis.

2. The packer unit of claim 1, wherein the fiber comprises at least one of an aramid and a polyester fiber.

3. The packer unit of claim 2, wherein the fiber comprises a pretreated aramid fiber pulp.

4. The packer unit of claim 1, wherein the fiber ranges in length from a chopped pulp size to about 9 mm.

5. The packer unit of claim 1, wherein the annular body comprises from about 1.25 to 3.75 parts per hundred rubber (phr) fiber.

6. The packer unit of claim 1, further comprising a plurality of metallic inserts radially distributed about the longitudinal axis and disposed within the elastomeric annular body.

7. The packer unit of claim 1, wherein the bore defines a sealing surface of the packer unit, and wherein the sealing surface is operable to be displaced inward in the direction of the longitudinal axis to completely seal the bore.

8. The packer unit of claim 1, wherein the elastomer further comprises at least one of sulfur, antioxidants, plasticizers, carbon black, process aids, accelerators, and ZnO based compounds.

9. The packer unit of claim 1, wherein the elastomer comprises a carboxylated nitrile rubber (XNBR) base polymer.

10. The packer unit of claim 1, wherein the elastomer comprises a nitrile rubber (NBR) base polymer.

11. The packer unit of claim 1, wherein the elastomer comprises a hydrogenated nitrile rubber (HNBR) base polymer.

12. A method of forming a packing unit for a blowout preventer, the method comprising
   forming a fiber reinforced elastomer comprising aligning fibers with a grain of an elastomer;
   cutting a portion from the fiber reinforced elastomer;
   loading the cut portion in a packing unit mold, wherein the packing unit mold is configured to form an annular elastic body that inserts within the blowout preventer and has a bore extending therethrough defining an axis of the packing unit mold, and wherein the cut portion is loaded in the packing unit mold such that the grain of the fiber reinforced elastomer of the cut portion is parallel to the axis of the packing unit mold; and
   heating the loaded packing unit mold.

13. The method of claim 12, wherein the aligning comprises at least one of milling and extruding the fiber reinforced elastomer.

14. The method of claim 12, further comprising placing metal inserts in the packing unit mold.

15. The method of claim 12, wherein cutting the portion from the fiber reinforced elastomer comprises cutting the portion with the grain such that a longitudinal axis of the cut portion is aligned with the axis of the packing unit mold.

16. The method of claim 12, wherein cutting the portion from the fiber reinforced elastomer comprises cutting the portion across the grain such that a longitudinal axis of the cut portion is perpendicular to the packing unit mold.

17. The method of claim 12, further comprising loading a plurality of cut portions into the mold.

18. The method of claim 17, wherein a longitudinal axis of the plurality of cut portions is aligned with the axis of the packing unit mold.

19. The method of claim 17, wherein a longitudinal axis of the plurality of cut portions is perpendicular to the packing unit mold.

20. An annular blowout preventer to be installed on a well, the annular blowout preventer comprising:
   a housing having a bore extending therethrough about a longitudinal axis;
   a packing unit disposed within the housing about the longitudinal axis,
   the packing unit comprising,
      an elastomer body including a compound selected from the group consisting of a nitrile rubber (NBR), a carboxylated nitrile rubber (XNBR), or a hydrogenated nitrile rubber (HNBR) base polymer having a polymer chain and a unidirectional orientation grain; and
      a quantity of fiber longitudinally aligned with the grain of the elastomer and aligned with the longitudinal axis; and
   a piston configured to move along the longitudinal axis and to squeeze the packing unit towards the longitudinal axis.

21. The packer unit of claim 1, wherein the elastomer is anisotropic.

* * * * *